United States Patent [19]

Wong

[11] Patent Number: 5,027,372
[45] Date of Patent: Jun. 25, 1991

[54] DIFFERENTIAL PHASE SHIFT KEYING MODULATOR

[75] Inventor: Hee Wong, San Jose, Calif.

[73] Assignee: National Semiconductor Corp., Santa Clara, Calif.

[21] Appl. No.: 21,918

[22] Filed: Mar. 4, 1987

[51] Int. Cl.[5] .............................................. H04L 27/20
[52] U.S. Cl. ........................................ 375/67; 332/103
[58] Field of Search ..................... 375/56, 67, 23, 56, 375/59, 67; 332/103, 144, 103, 104, 112

[56] References Cited

U.S. PATENT DOCUMENTS

| | | | |
|---|---|---|---|
| 3,958,191 | 5/1976 | Jones, Jr. ........................... | 375/56 |
| 4,008,373 | 2/1977 | Nash et al. ........................ | 375/56 |
| 4,206,423 | 6/1980 | Nossen .............................. | 375/67 |
| 4,442,530 | 4/1984 | Parrish, Jr. et al. .............. | 375/67 |
| 4,504,802 | 3/1985 | Heatherington ................... | 375/52 |
| 4,583,238 | 4/1986 | Boisseau et al. .................. | 375/56 |
| 4,617,535 | 10/1986 | Unerdem .......................... | 375/67 |
| 4,706,261 | 11/1987 | Torre et al. ...................... | 375/56 |

*Primary Examiner*—Benedict V. Safourek
*Attorney, Agent, or Firm*—Limbach, Limbach & Sutton

[57] ABSTRACT

A differential phase shift keying (DPSK) modulator utilizes time-domain filtering techniques. The DPSK modulator includes a data scrambler which receives a serial digital data input signal and generates an output signal representing the dibit value of the serial input sequence. The dibit signal is differentially encoded and then provided to a history generator which produces phase modulating vectors utilizing pulse density modulation (PDM). The carrier waveform is then modulated utilizing the modulating vectors to generate a DPSK output signal.

6 Claims, 19 Drawing Sheets

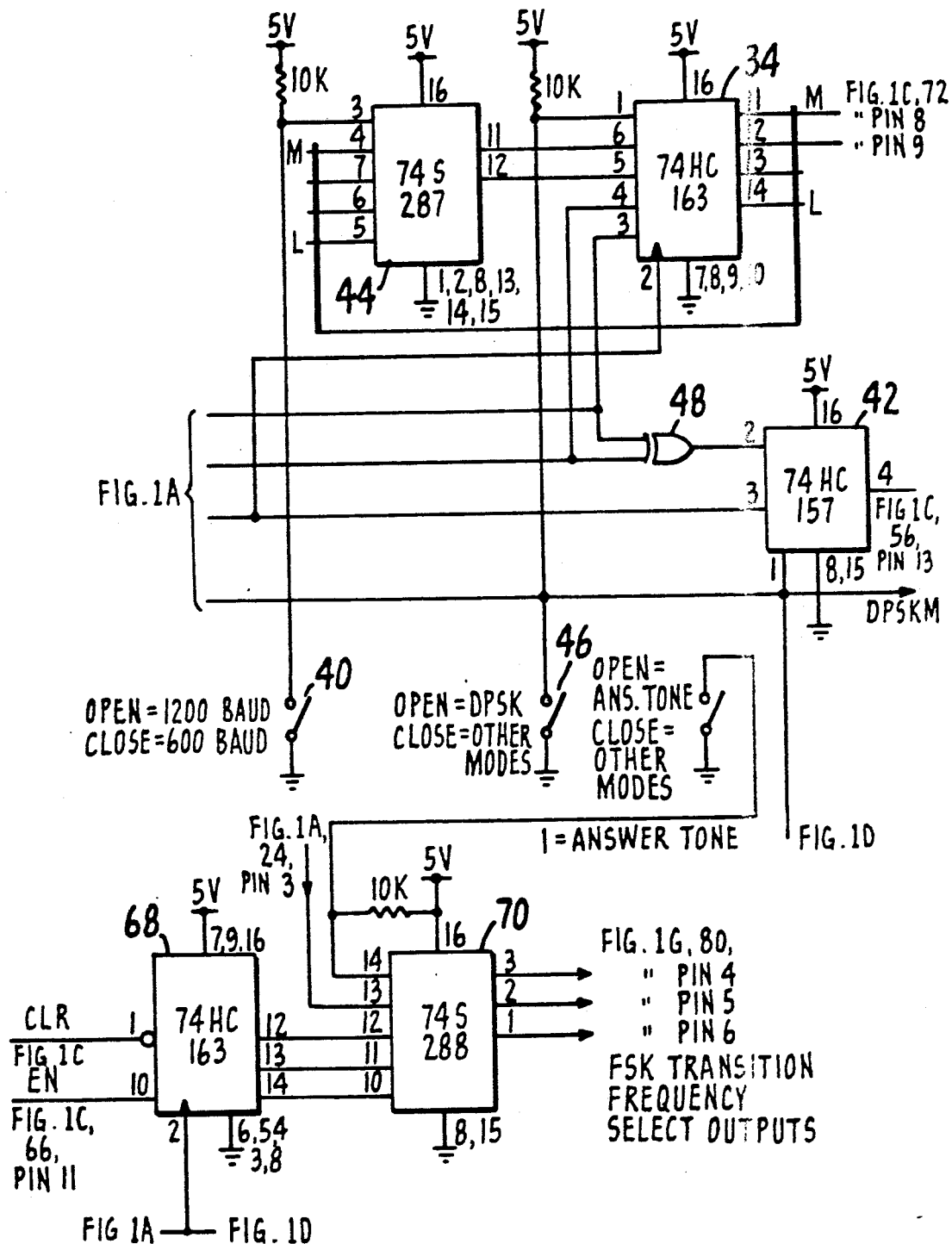
FIG_1B

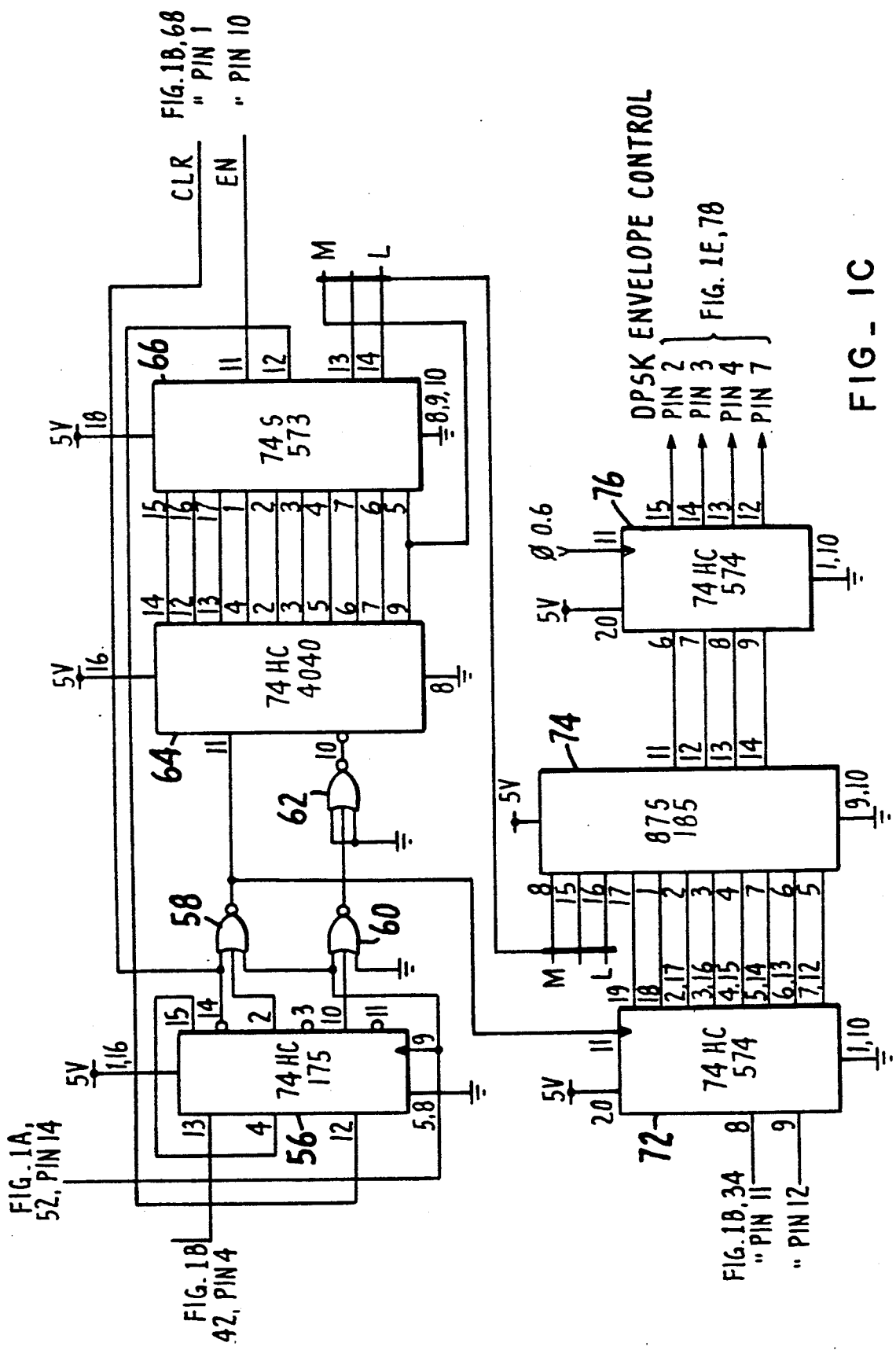

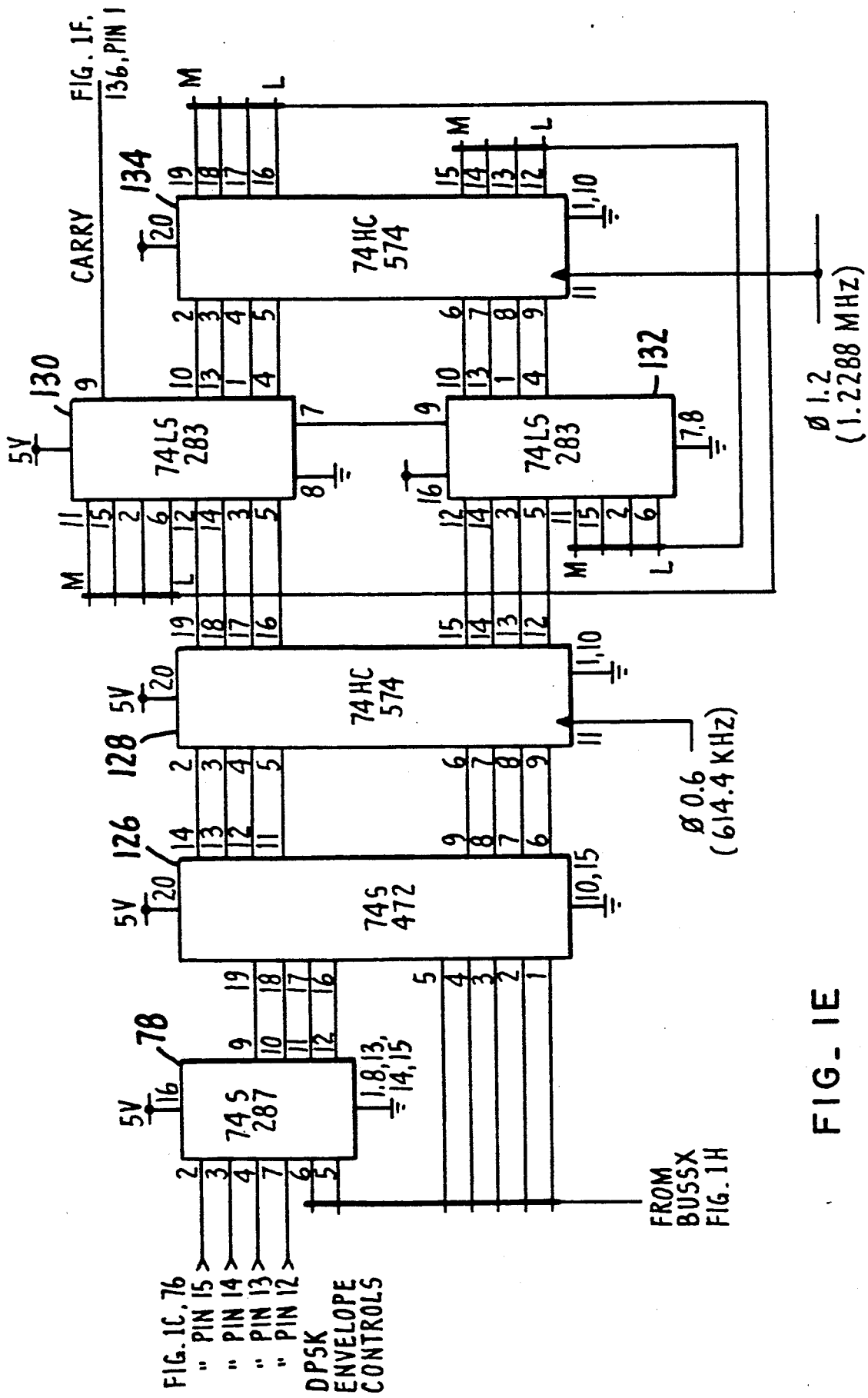

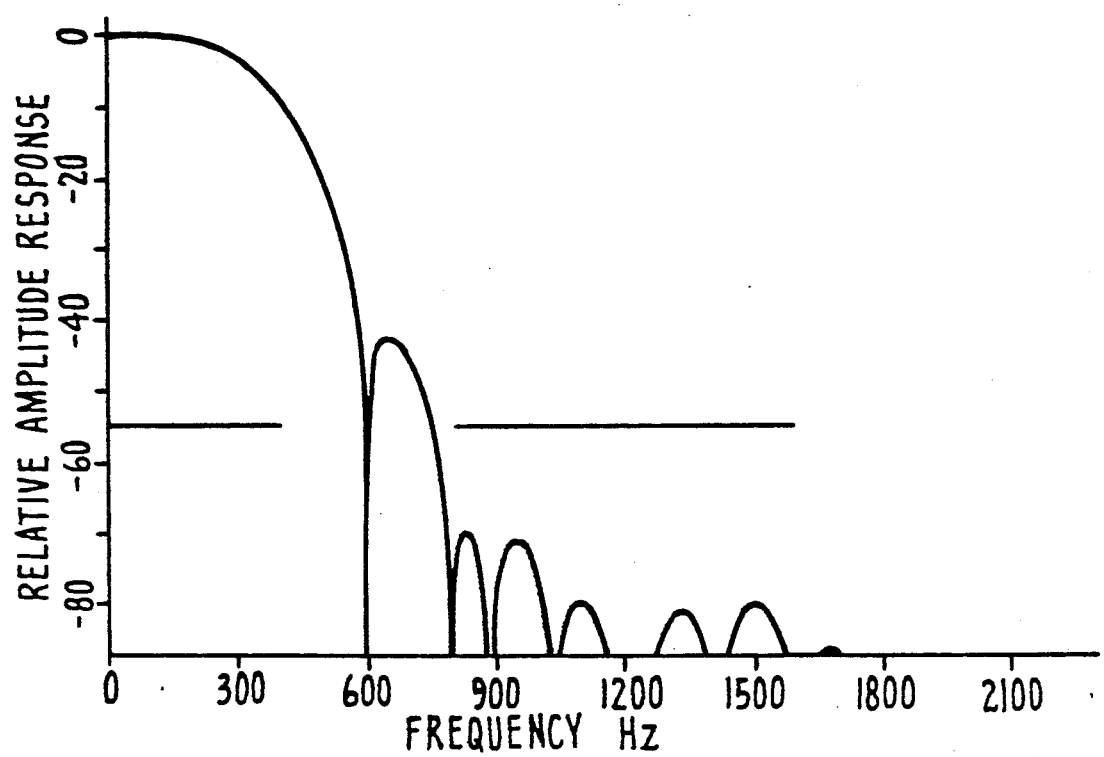
FIG_3
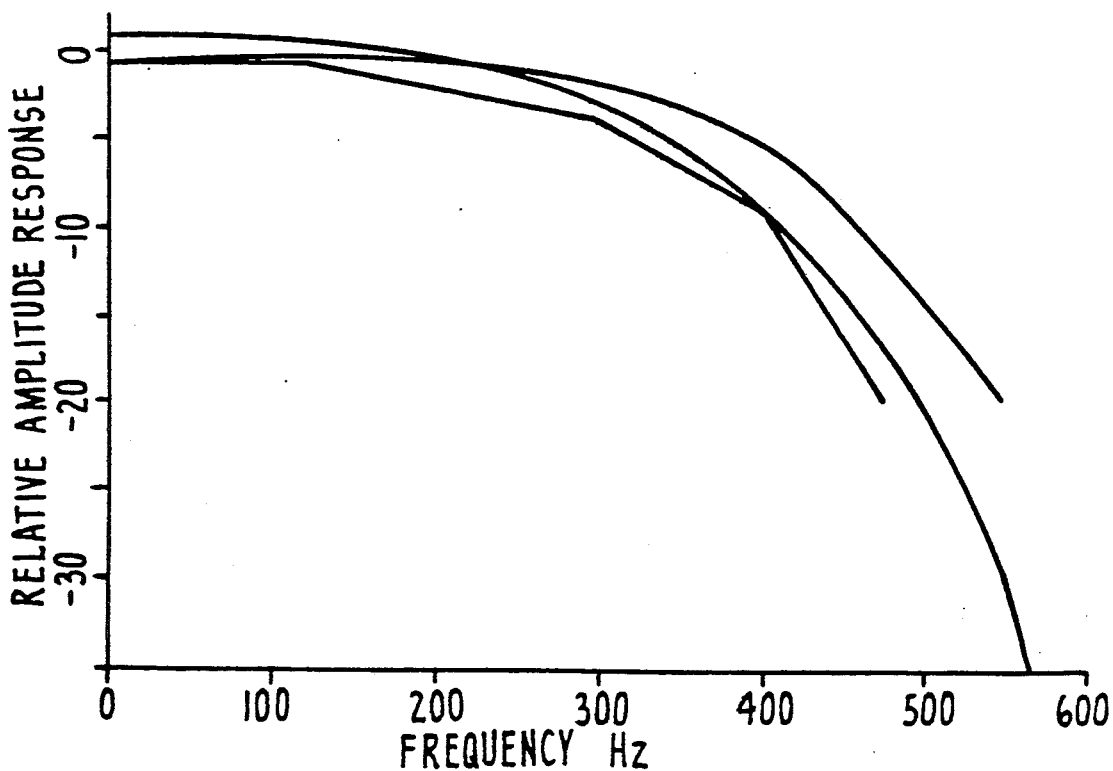
FIG_4

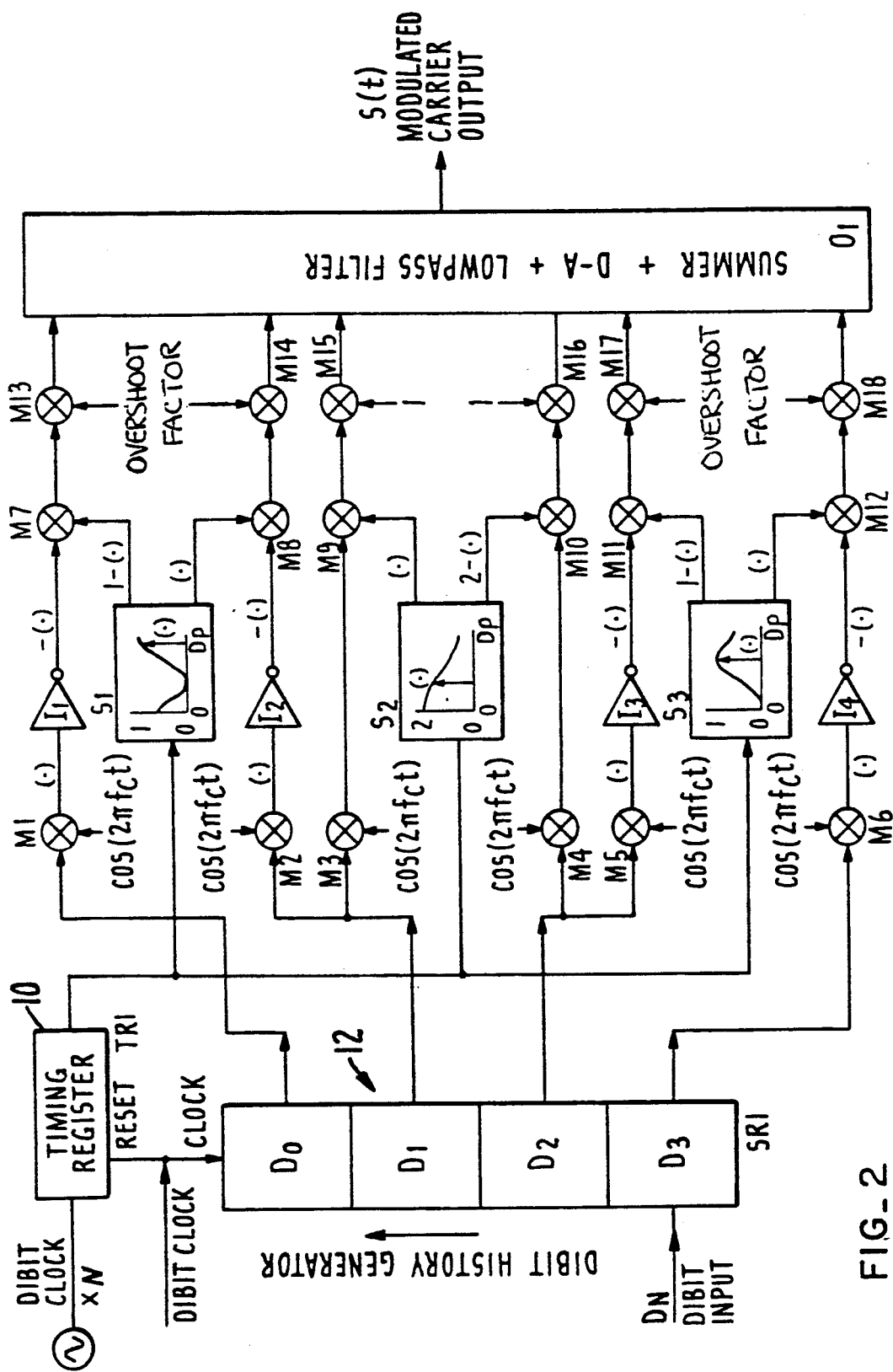
FIG_2

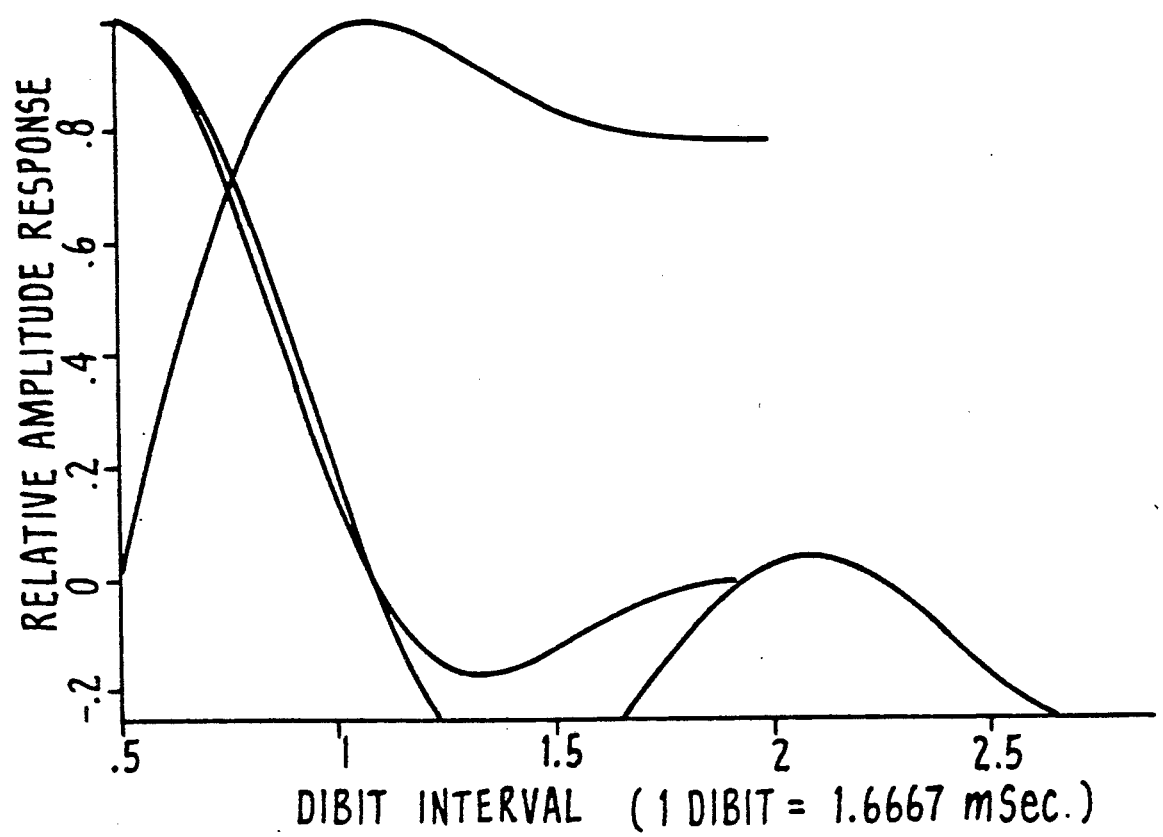
FIG_5

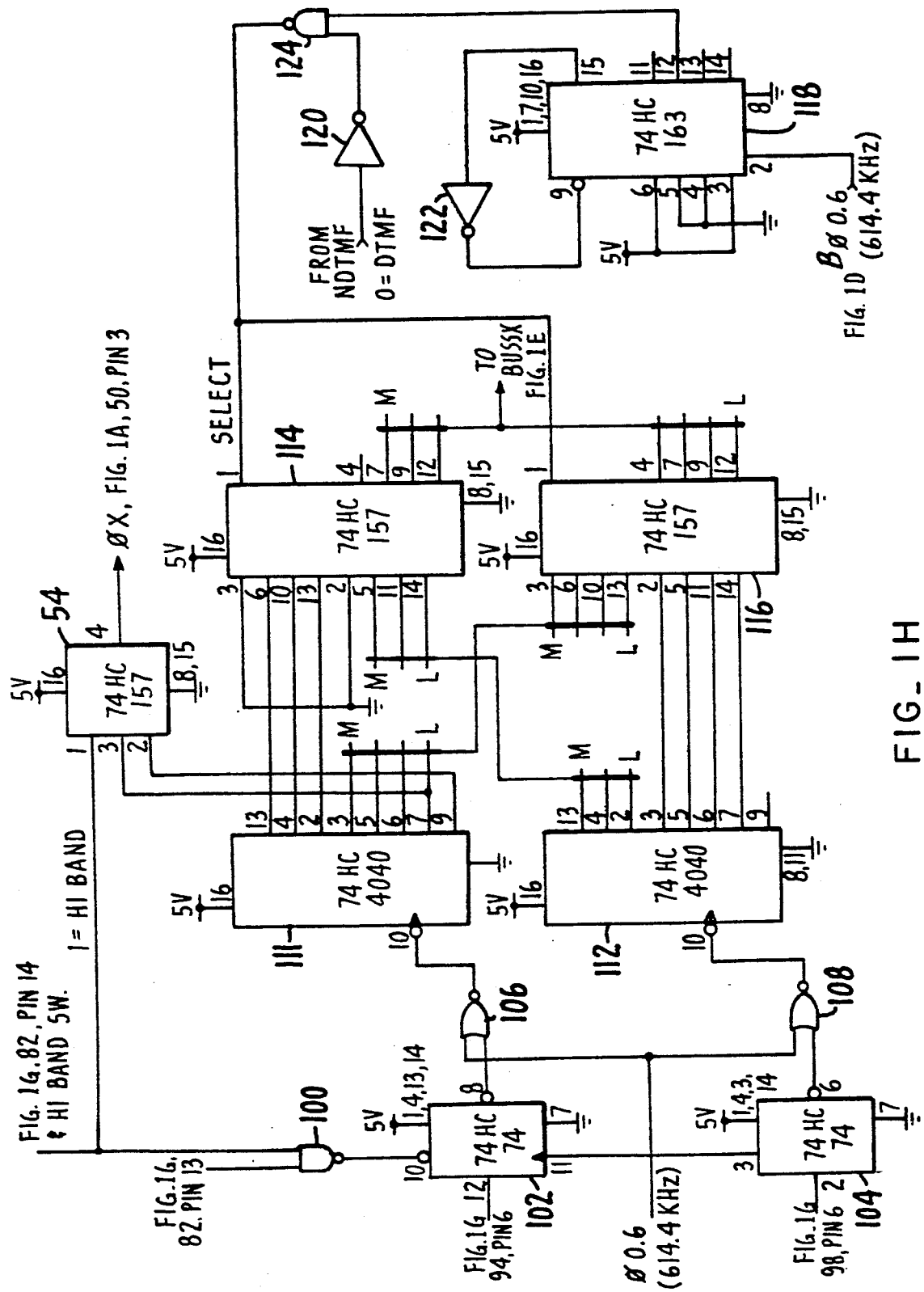
FIG_1H

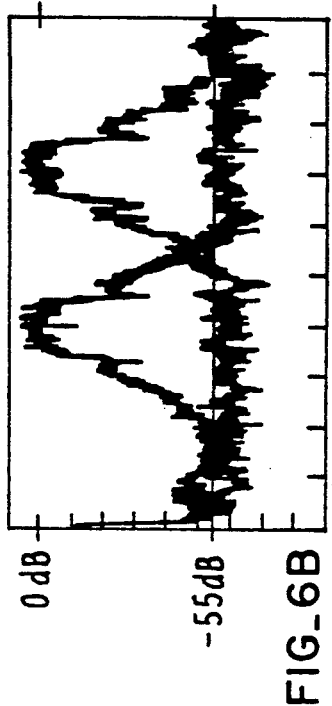
DPSK: 1200 BIT PER SEC, 511 PRN DATA SEQUENCE
FIG_6A
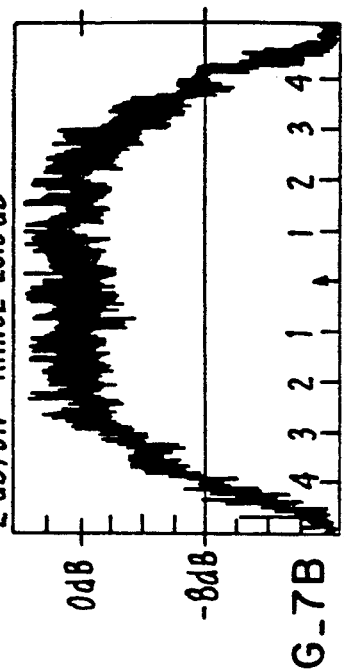
FSK: 300 BIT PER SEC, 511 PRN DATA SEQUENCE
FIG_6B
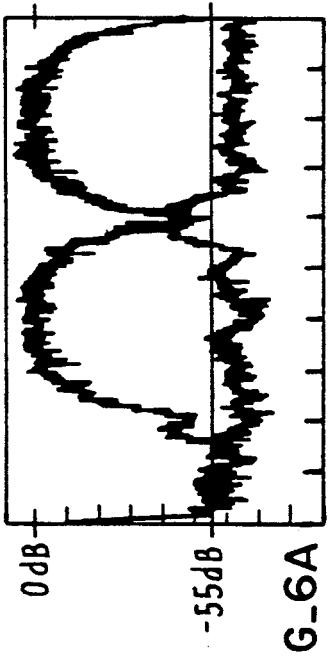
LOW BAND: DATA RATE: 1200 BIT PER SEC, 511 PRN DATA SEQUENCE
FIG_7A
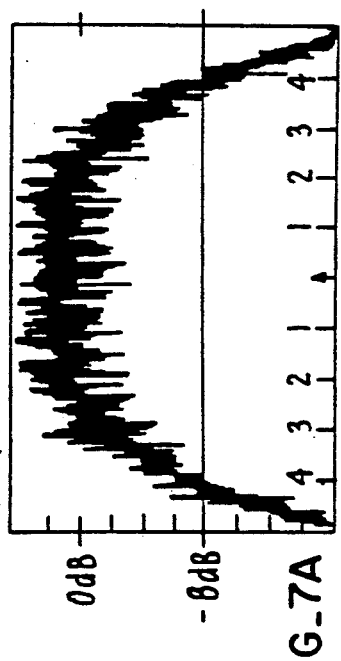
HIGH BAND: DATA RATE: 1200 B./SEC, 511 PRN D. SEQ.
FIG_7B

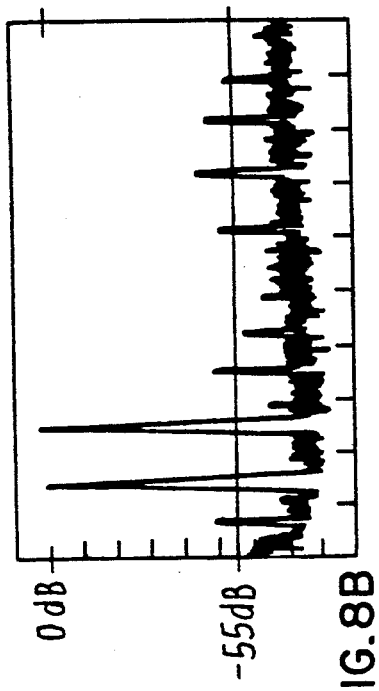
FIG._8B INPUT=1, KEY="1"
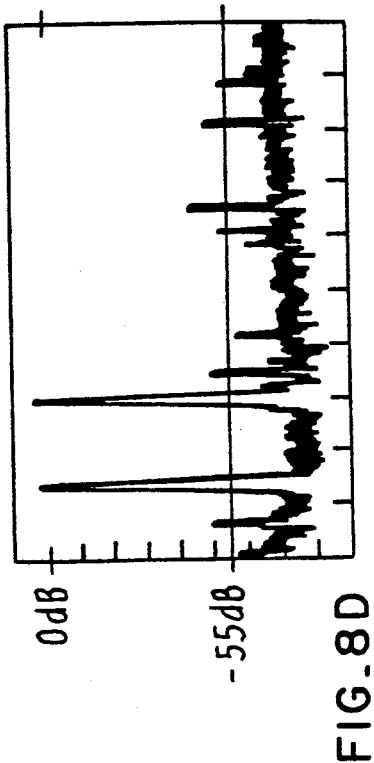
FIG._8D INPUT=3, KEY="3"
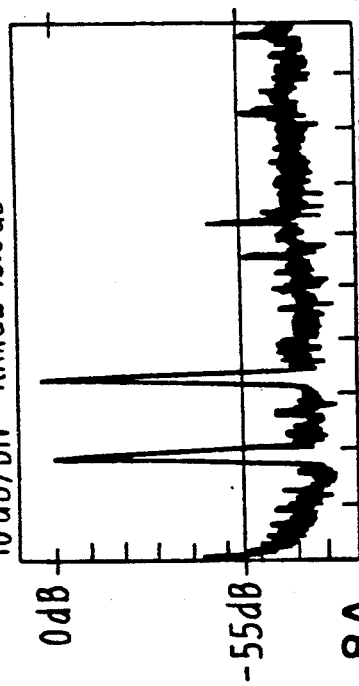
FIG._8A INPUT=0, KEY="D"
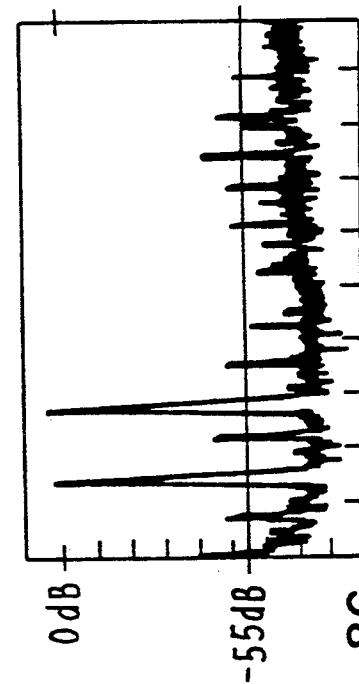
FIG._8C INPUT=2, KEY="2"

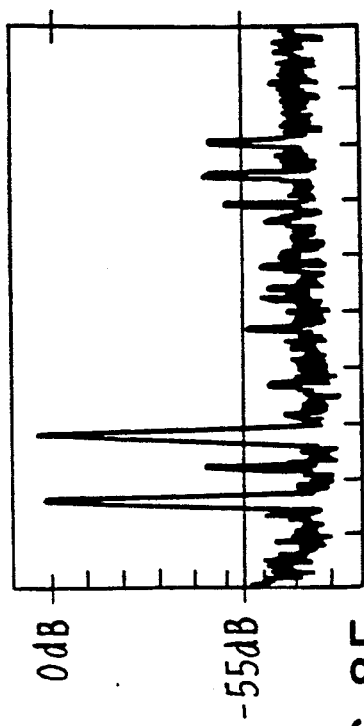
FIG_8E INPUT=4, KEY="4"
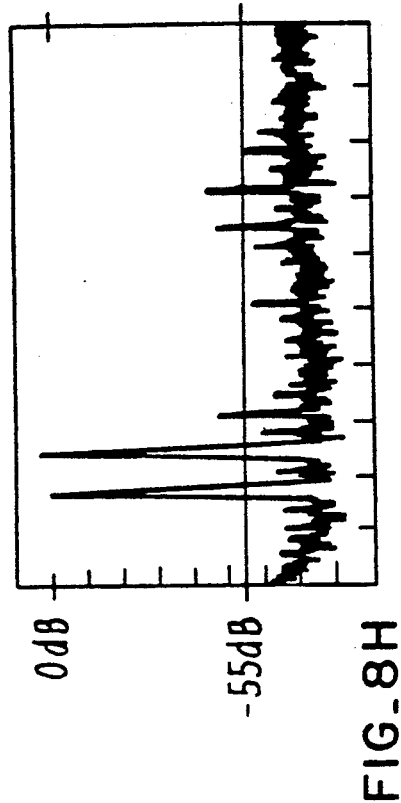
FIG_8F INPUT=5, KEY="5"
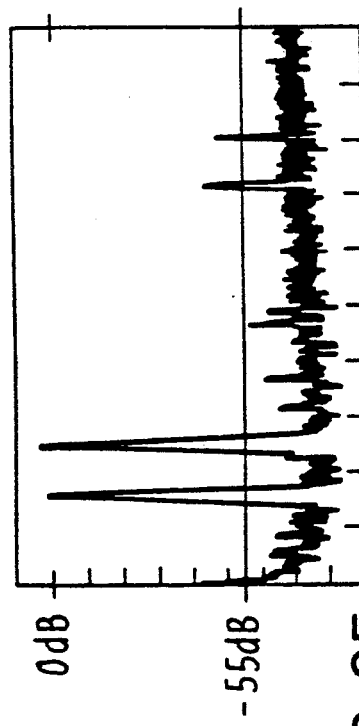
FIG_8G INPUT=6, KEY="6"
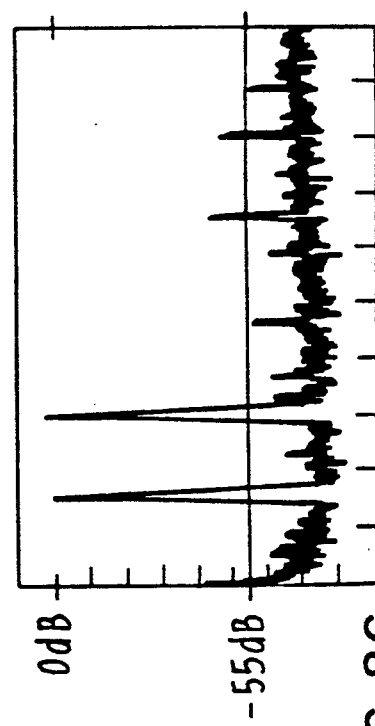
FIG_8H INPUT=7, KEY="7"

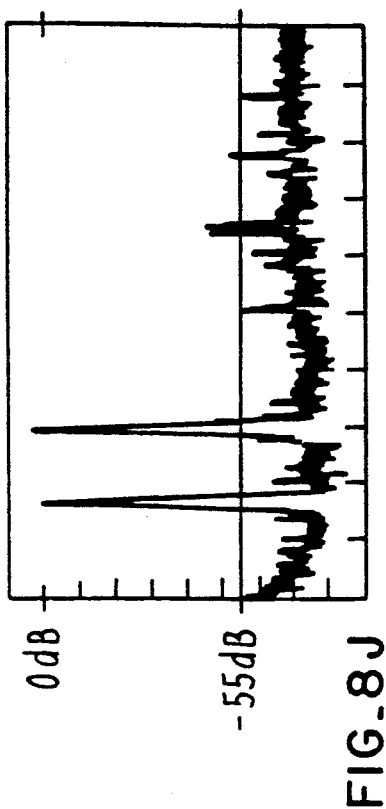
FIG._8I  INPUT = 8, KEY = "8"
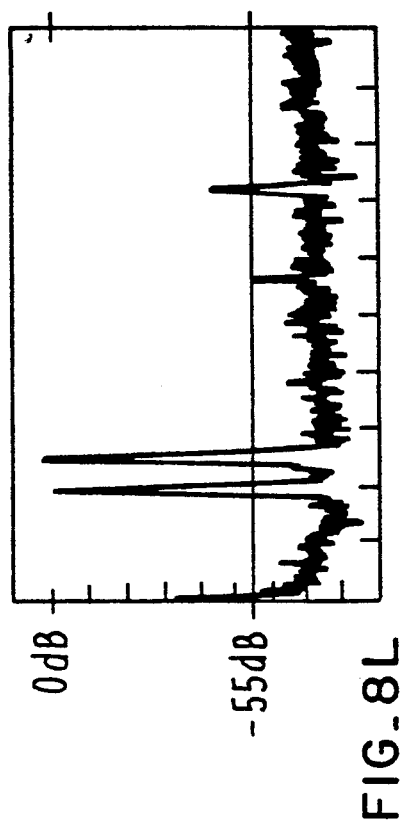
FIG._8J  INPUT = 9, KEY = "9"
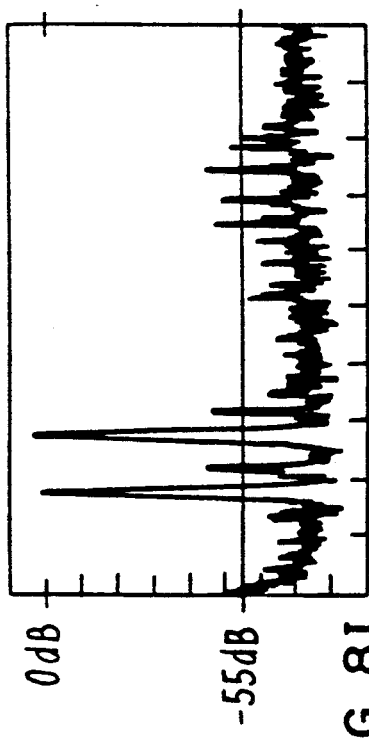
FIG._8K  INPUT = 10, KEY = "0"
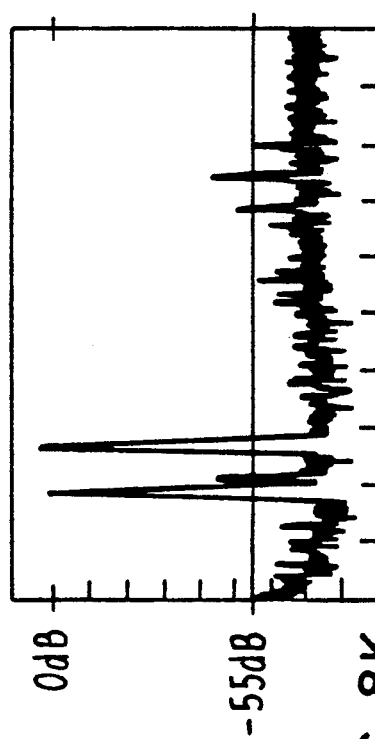
FIG._8L  INPUT = 11, KEY = "*"

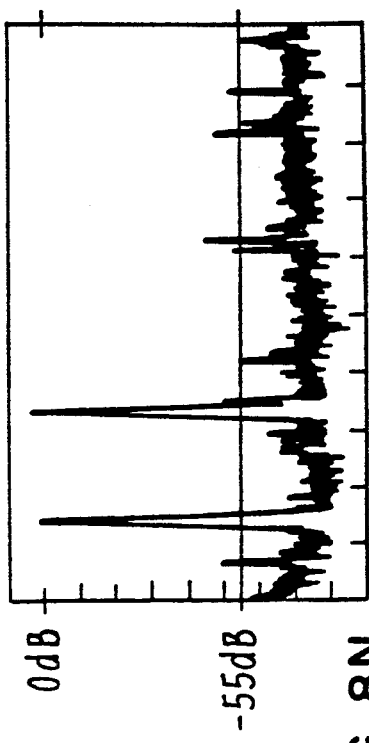
FIG._8N  INPUT=13, KEY="A"
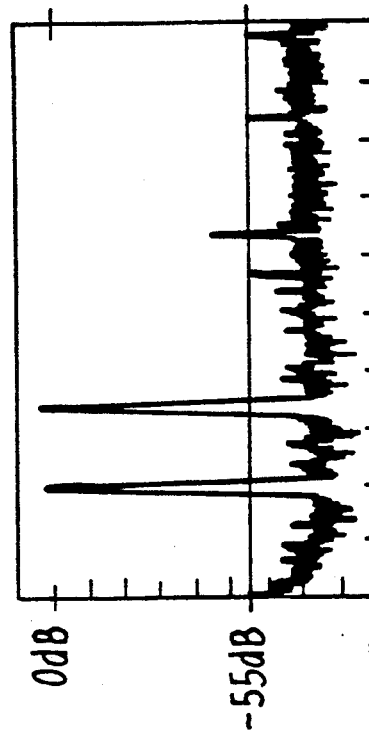
FIG._8P  INPUT=15, KEY="C"
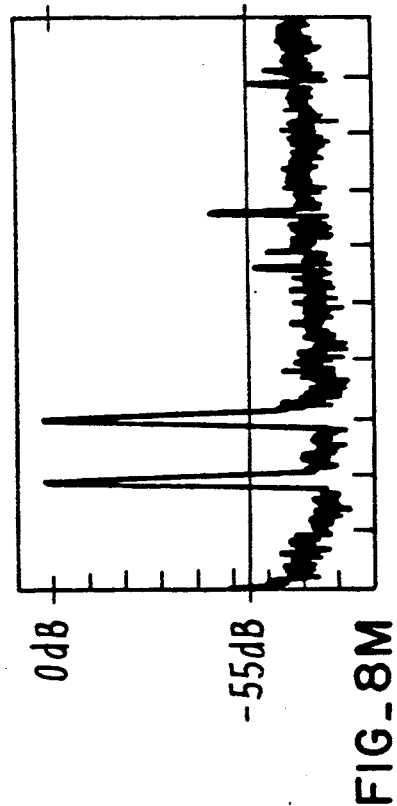
FIG._8M  INPUT=12, KEY="#"
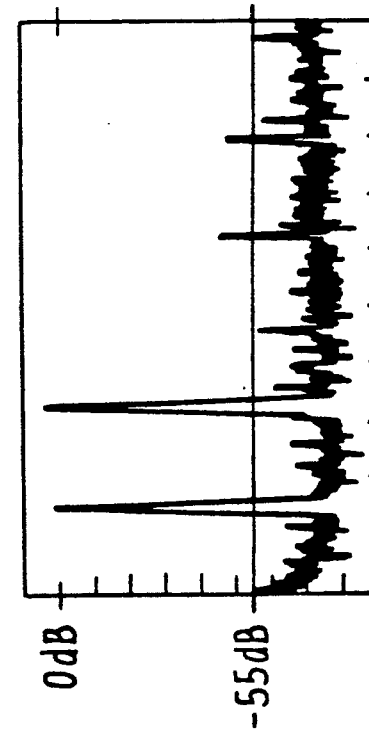
FIG._8O  INPUT=14, KEY="B"

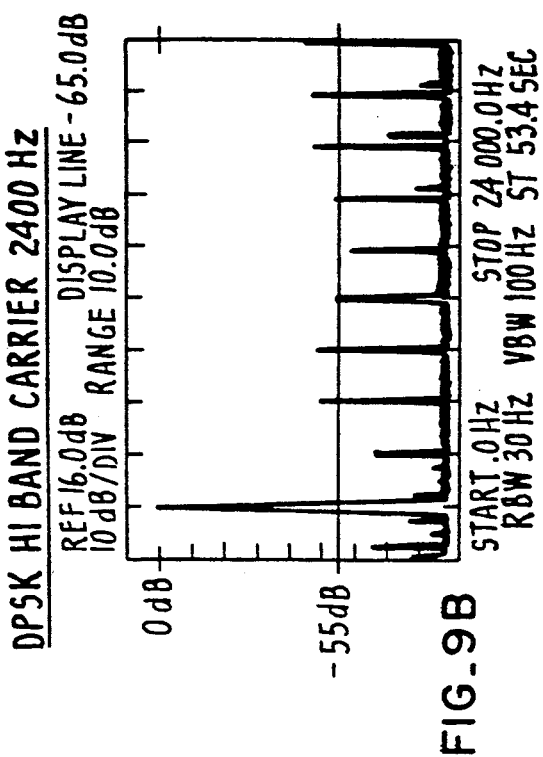
FIG._9A
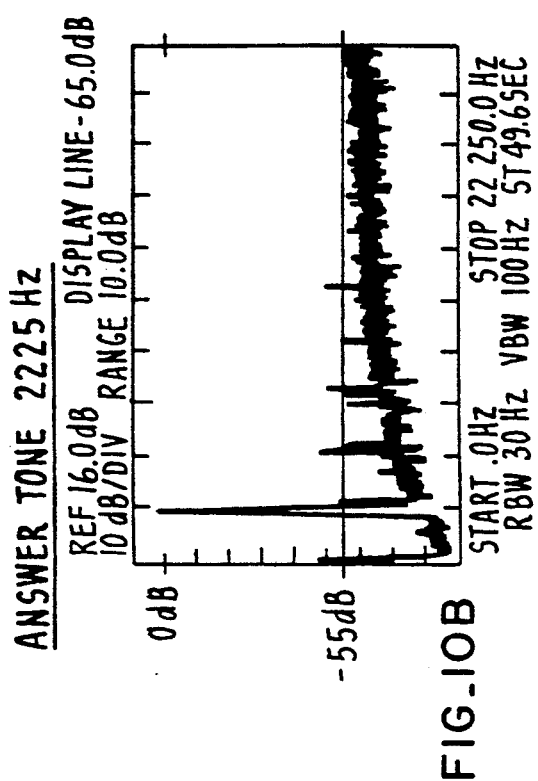
FIG._9B
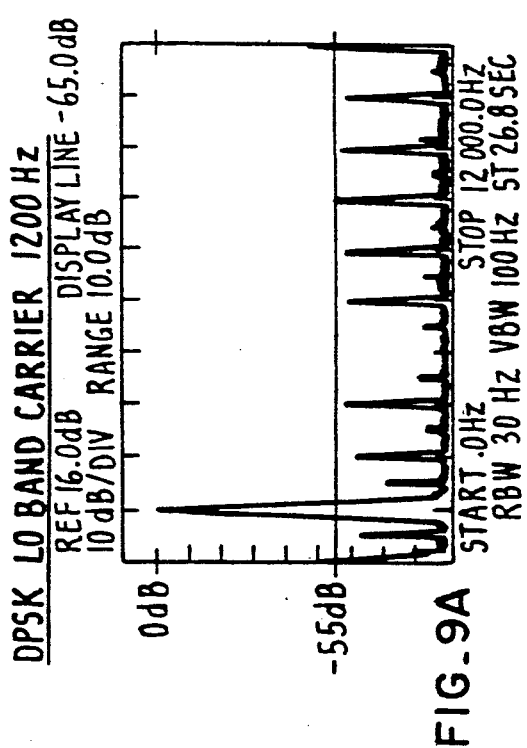
FIG._10A
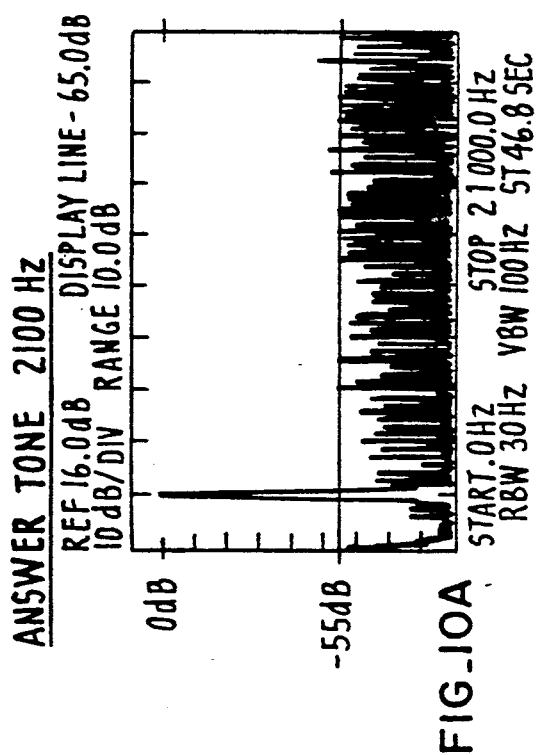
FIG._10B

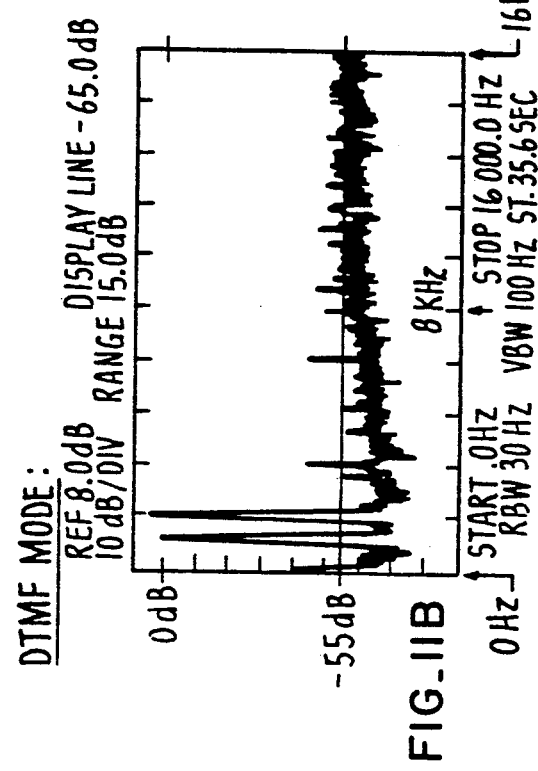
FIG._IIB DTMF MODE:
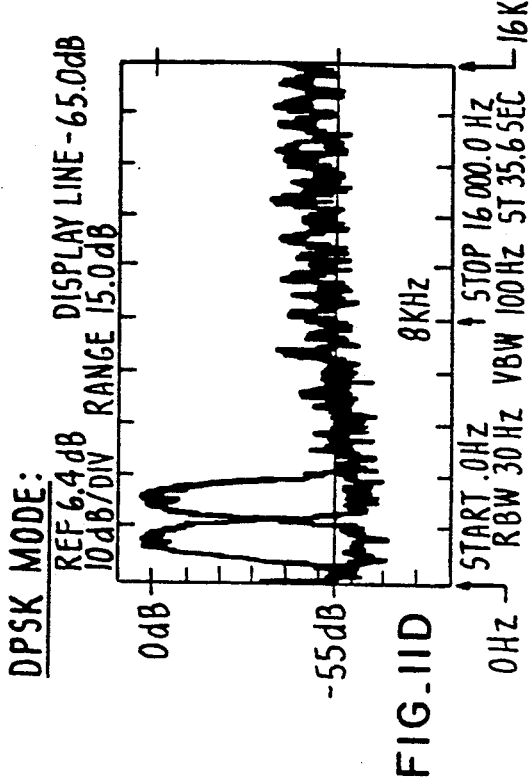
FIG._IID DPSK MODE:
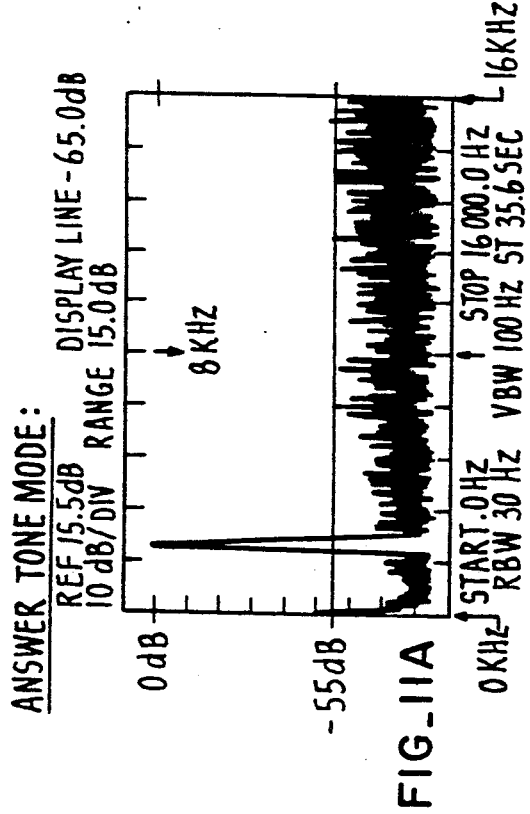
FIG._IIA ANSWER TONE MODE:
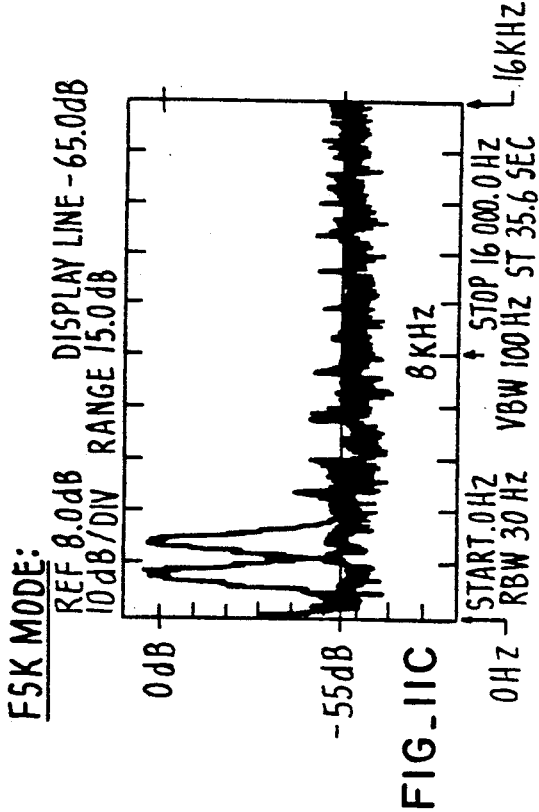
FIG._IIC FSK MODE:

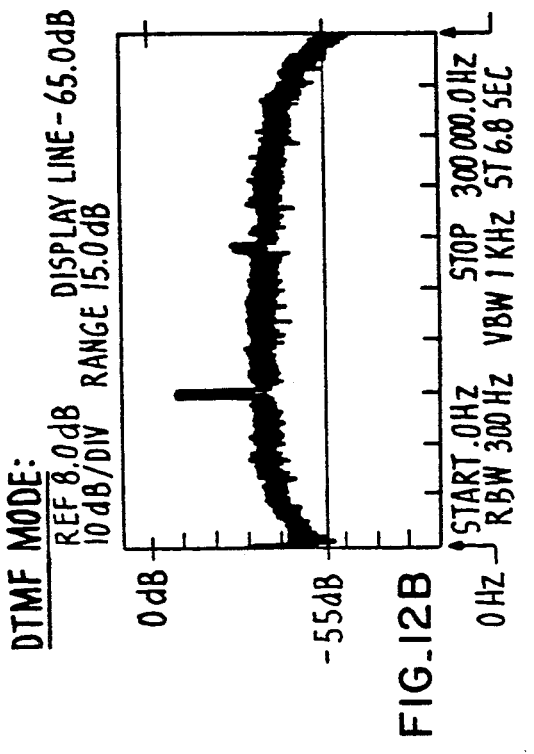
FIG._12A ANSWER TONE MODE
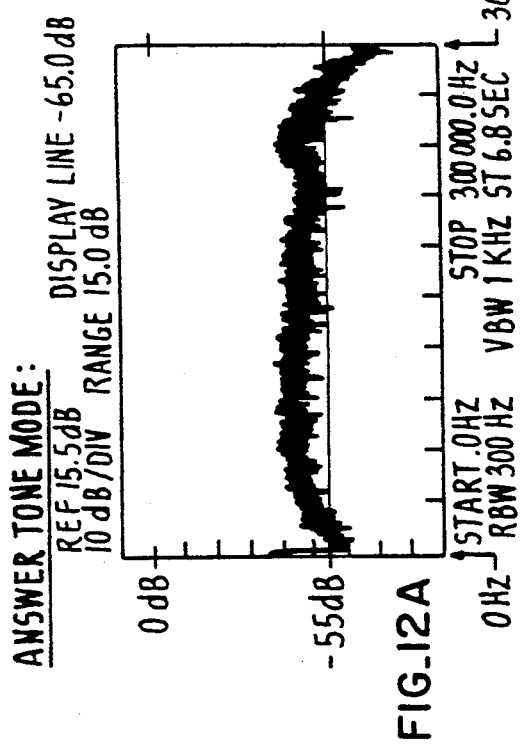
FIG._12B DTMF MODE
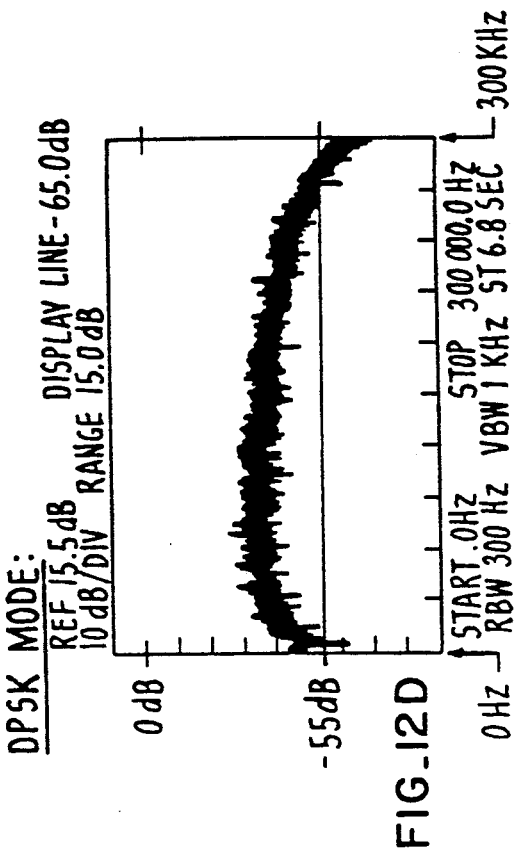
FIG._12C FSK MODE
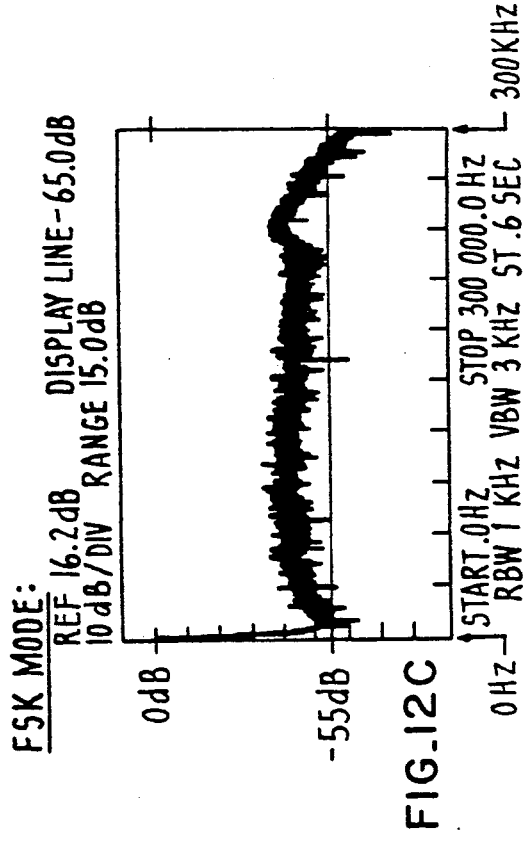
FIG._12D DPSK MODE

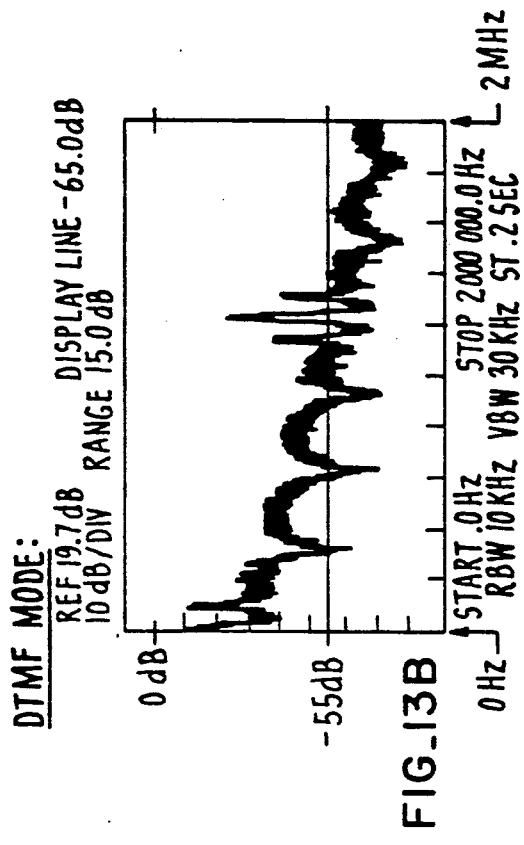
FIG_13B
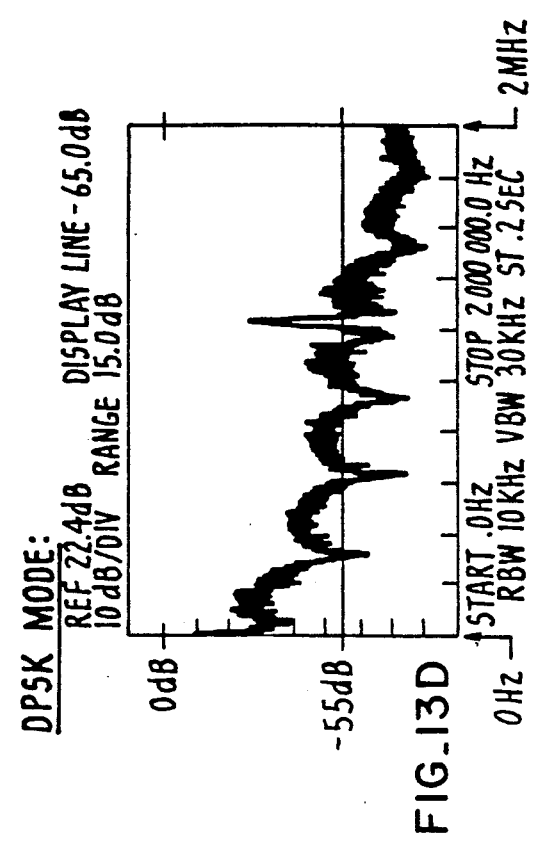
FIG_13D
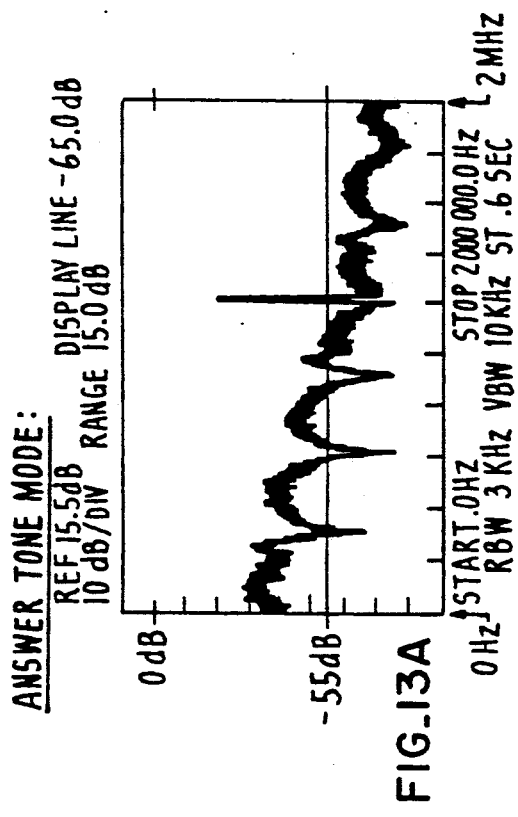
FIG_13A
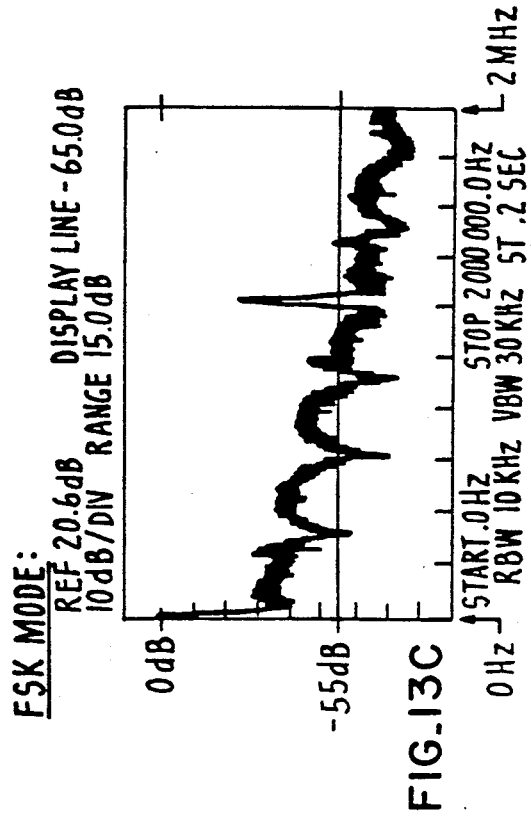
FIG_13C

DIFFERENTIAL PHASE SHIFT KEYING MODULATOR

MICROFICHE APPENDICES

Microfiche Appendices A-G, comprising one microfiche of 31 frames, are included as part of this patent document.

COPYRIGHT NOTICE

A portion of the disclosure of this patent document contains unpublished material which is subject to copyright protection. The copyright owner, National Semiconductor Corporation, has no objection to the facsimile reproduction by anyone of the patent document or the patent disclosure, as it appears in the U.S. Patent and Trademark Office patent file or records, but otherwise reserves all rights.

BACKGROUND OF THE INVENTION

1. Field of the Invention

The present invention relates to electrical communications systems and, in particular, to a differential phase shift keying modulator that modulates a carrier waveform utilizing pulse density modulation (PDM).

2. Discussion of the Prior Art

The basic function of a communications system is to transmit information from a source to a destination as fast and as accurately as possible. The source and the destination are physically separated from one another and are connected by a communications channel.

There are two types of information sources: analog information sources and discrete information sources. Analog sources, such as a microphone, produce a continuous signal. Discrete sources, such as a digital computer, generate a signal consisting of a sequence of pulses. Analog signals can be converted to discrete signals by utilizing sampling and quantizing techniques.

Communications channels which are designed to handle voice transmissions (i.e., the telephone network) have characteristics which make it difficult for them to transmit digital signals. To permit the transmission of digital bit streams over a voice channel, it is necessary to utilize the digital data pulses to modulate a carrier waveform having a frequency which is compatible with the voice channel.

The equipment which performs the required modulation is generally referred to as a "modem". The term "modem" is an acronym for MOdulator-DEModulator, since the equipment typically includes the capability not only to modulate transmitted signals but also to demodulate received signals.

Generally speaking, as stated above, a modulator receives a serial digital data bit stream from an information source and converts the bit stream to a waveform suitable for transmission over the communication channel. In addition to matching the frequency spectrum of the transmitted signal with the characteristics of the communication channel, the modulator also minimizes the effect of signal distortion caused by the non-ideal nature of the communications channel.

There are three basic modulation types: (1) amplitude-shift keying (ASK), (2) frequency-shift keying (FSK), and (3) phase-shift keying (PSK).

Data transmission systems which operate at lower data rates, i.e. 1200 baud or less, typically utilize FSK modulation. In FSK modulation, the two binary states are represented by two different frequencies and are detected by using two frequency tuned sections, one tuned to each of the two bit frequencies. The demodulated signals are then integrated over the duration of a bit and a binary decision is based on the result.

For systems that use higher data rates, various forms of PSK modulation are generally utilized.

A 2-phase PSK modulator uses one phase of the carrier frequency for one binary state and a second phase for the other binary state. The two phases are 180° apart and are detected by a synchronous detector using a reference signal at the receiver which is of known phase with respect to the incoming signal.

In a 4-phase PSK modulator, the carrier waveform is switched 0°, 90°, 180° or 270° relative to the reference to represent a dibit data signal.

In a variation of the basic PSK modulation technique, differential phase-shift keying (DPSK), the digital pulse information is contained in the phase change between adjacent pulse intervals. For example, in the commonly-used ±45°, ±135° 4-phase DPSK system, a phase change from one interval to the next of +45° encodes the binary code 11, +135° encodes 01, −135° encodes 00, and −45° encodes 10.

The advantage of DPSK over PSK is that there is no need to transmit a phase reference. All that is required at the receiver end is a short-term memory device to store the phase for one pulse interval.

Conventional analog phase modulators require complicated base-band filtering circuits to shape the in-band frequency spectrum. In addition, expensive carrier multipliers, summers and in-phase/quadrature phase splitter networks are usually involved in designing multi-phase modulator circuits.

Conventional digital modulators employ very high-order filters to remove abrupt phase transitions and equalizer circuits to obtain linear-band phase response.

SUMMARY OF THE INVENTION

The present invention provides a modulator/generator circuit with particular application for certain modems, i.e. Bell 212A or V.22 modems.

The circuit integrates the following features: a 1200 baud 4-phase differential phase shift keying (DPSK) modulator, a 300 baud frequency shift keying (FSK) modulator, a dual tone multi-frequency generator (DTMF) and a 2100/2225 Hz answer tone generator.

The specification of a Bell-212A or V.22 modem calls for a 4-phase differential modulator which includes the following features:

(1) an x/sinx equalizer for in-band spectrum shaping;
(2) a raised-cosine roll-off shaping filter for minimizing intersymbol interferences and adjacent-channel interferences; and
(3) the group delay of the transmit output must be within ±100 microseconds.

The DPSK modulator section of the circuit of the present invention utilizes time-domain filtering techniques to meet the requirements of the Bell-212A/V.22 specification. It includes a spectrum controller that shapes the in-band frequency spectrum and attenuates the adjacent channel frequency components. This eliminates the conventional requirement of band-pass filters that are typically placed after the modulator.

Thus, the present invention provides a DPSK modulator which includes a data scrambler which receives a serial digital data input signal and generates an output signal representing the dibit value of the serial input sequence. The dibit signal is differentially encoded and then provided to a history generator which produces phase modulating vectors utilizing pulse density modulation. The carrier waveform is then modulated utilizing the modulating vectors to generate a DPSK output signal.

The entire circuit of the present invention, including a waveform synthesis digital-to-analog converter (DAC), is implemented digitally. A simple low pass filter, in this case an RC network, is utilized to convert the digital output signal to analog form for telephone line interface.

A better understanding of the features and advantages of the present invention will be obtained by reference to the following detailed description of the invention and accompanying drawings which set forth an illustrative embodiment in which the principles of the invention are utilized.

DESCRIPTION OF THE DRAWINGS

FIGS. 1A-1H combine to provide a schematic diagram illustrating a modulator/generator circuit in accordance with the present invention.

FIG. 2 is a schematic block diagram illustrating a model of a DPSK modulator section of a circuit in accordance with the present invention.

FIG. 3 is a graph illustrating the out-of-band amplitude/frequency response curve of the circuit shown in FIGS. 1A-1H.

FIG. 4 is a graph illustrating the in-band amplitude/frequency response curve of the circuit shown in FIGS. 1A-1H.

FIG. 5 is a graph illustrating both the impulse response and the step response of the circuit shown in FIGS. 1A-1H.

FIGS. 6A and 6B are performance displays illustrating adjacent channel rejection for 1200 Hz DPSK mode and 300 Hz FSK mode operation, respectively, of the circuit shown in FIGS. 1A-1H.

FIGS. 7A and 7B are performance displays illustrating low band and high band DPSK in-band frequency response, respectively, of the circuit shown in FIGS. 1A-1H.

FIGS. 8A-8P are performance displays illustrating the DTMF generator output spectrum of the circuit shown in FIGS. 1A-1H.

FIGS. 9A and 9B are performance displays illustrating tone purity for the DPSK Lo-band carrier and the DPSK Hi-band carrier, respectively, of the circuit shown in FIGS. 1A-1H.

FIGS. 10A and 10B are performance displays illustrating answer tone purity at 2100 Hz and 2225 Hz, respectively, for the circuit shown in FIGS. 1A-1H.

FIGS. 11A-11D are performance displays illustrating 0-16 KHz out-of-band rejection for answer tone mode, DTMF mode, FSK mode and DPSK mode operation, respectively, of the circuit shown in FIGS. 1A-1H.

FIGS. 12A-12D are performance displays illustrating 0-300 KHz out-of-band rejection for answer tone mode, DTMF mode, FSK mode and DPSK mode operation, respectively, of the circuit shown in FIGS. 1A-1H.

FIGS. 13A-13D are performance displays illustrating 0-2 MHz out-of-band rejection for answer tone mode, DTMF mode, FSK mode and DPSK mode operation, respectively, of the circuit shown in FIGS. 1A-1H.

DETAILED DESCRIPTION OF THE PREFERRED EMBODIMENT

Figure 1A:
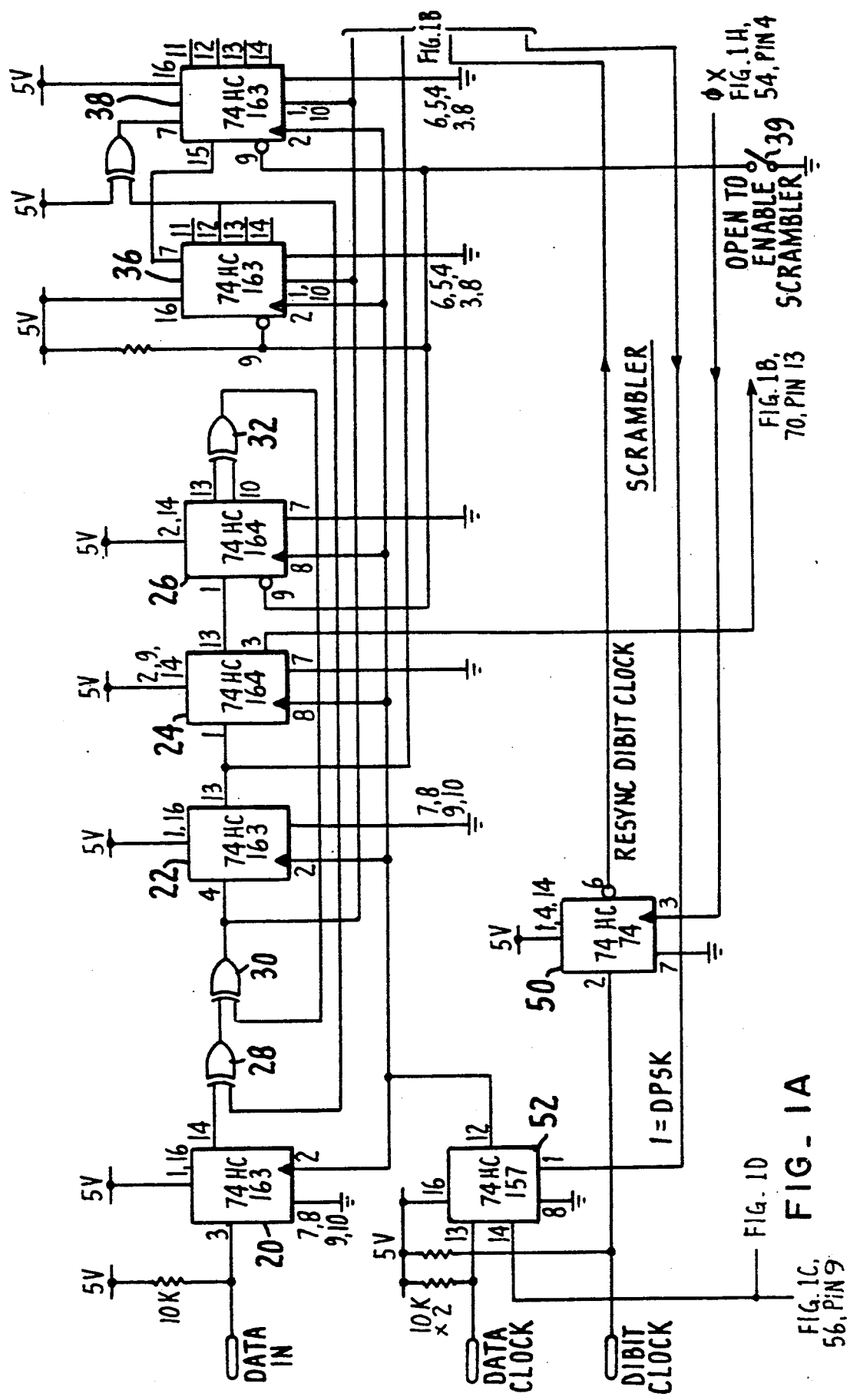
Figure 1D:
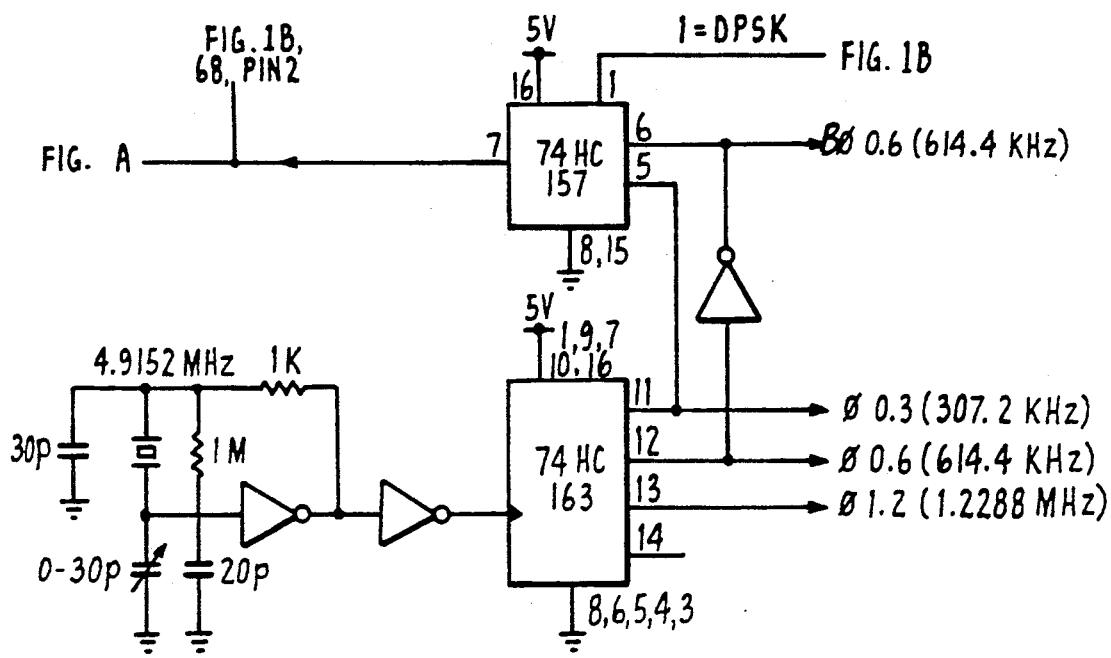

The present invention is directed to a modulator/generator circuit for use in modem applications, and having particular use in Bell-212A or V.22 modems.

The circuit of the present invention integrates the following functions:
1. a 1200 baud 4-phase differential phase shift keying (DPSK) modulator;
2. a 300 baud frequency shift keying (FSK) modulator;
3. a dual tone multi-frequency (DTMF) generator; and
4. 2100 and 2225 Hz answer tone generators.

A complete schematic diagram of a modulator/generator circuit in accordance with the present invention is shown in the combination of FIGS. 1A-1H.

The 4-phase DPSK section of the circuit receives a dibit input signal and generates a low harmonics (more than 60 dB rejection) modulated output. The in-band frequency shaping and delay characteristics of the DPSK section are all programmable through the use of Read-Only-Memories (ROM). Therefore, the results are both predictable and integratable.

The DPSK modulator, described in detail below, utilizes time-domain filtering to meet the above-stated requirements of the Bell-212A or V.22 modem specification. First, the step response characteristic of the system is computed. These results are then used to code two ROMs which perform the key functions of the system, "phase envelope generation" and "carrier insertion/vector summing", respectively. Additional circuitry is provided to complete the digital portion of the DPSK modulator. The output of the digital portion of the DPSK modulator is available as an eight-bit code which drives a digital-to-analog converter, or DAC, for waveform synthesis.

Anti-alias frequencies are removed by a simple analog low-pass filter placed after the DAC. A 3 dB cut-off frequency is designed such that the in-band frequency/phase characteristic of the DPSK modulator is not affected by this filter.

FIG. 2 provides a model of the DPSK modulator portion of the circuit shown in FIGS. 1A-1H.

A timing register 10 is used to provide synchronization for the three envelope signals to the dibit clock.

An incoming dibit signal $D_n$ is shifted into a dibit history generator 12 at each dibit interval. The four sets of outputs, i.e. D3, D2, D1 and D0, represent the binary weighted values of the consecutive dibits. These values are ranged from 0 to 3 because the system is a 4-phase modulator. The direction of shifting is from D3 to D0; i.e., the most recent value is depicted by D3. The four dibit outputs D3–D0 are connected to six multipliers M1–M6 to perform phase modulation. The general output equation for these six multipliers is $$mx(t) = \cos(2^*pi^*fc^*t + Ip + Dx^*pi/2) \qquad (1)$$

where "x" denotes the order of the multipliers and "Dx" is the general case for D0, D1, D2 and D3. The remaining terms are defined below. Inverters I1–I4 invert the sign of the m1(t), m2(t), −m5(t) and m6(t) vectors. Vectors −m1(t), −m2(t), m3(t), m4(t), −m5(t) and −m6(t) are then individually routed to six density function modulators M7–M12, respectively. The modulators also receive input from the three envelope generators S1, S2 and S3. Following these modulators M7–M12, the signals are scaled according to the breakdowns of a step response, which is described below. The last step is to process the six resulting vectors in a combination summer/DAC/low-pass filter to form the modulated carrier output s(t).

A system equation can be derived based on the FIG. 2 model. The output s(t) of the DPSK modulator is thus given by $$S(t) = -\{0.13 * [1 - S1(t/Dp - t\ Dp)] * [\cos(2*pi*fc*t + Ip + D0*pi/2)]\} - \{0.13 * [S1(t/Dp - t\ Dp)] * [\cos(2*pi*fc*t + Ip + D1*pi/2)]\} + \{1 * [S2(t/Dp - t\ Dp)] * [\cos(2*pi*fc*t + Ip + D1*pi/2)]\} + \{1 * [2 - S2(t/Dp - t\ Dp)] * [\cos(2*pi*fc*t + Ip + D2*pi/2)]\} - \{0.13 * [1 - S3(t/Dp - t\ Dp)] * [\cos(2*pi*fc*t + Ip + D2*pi/2)]\} - \{0.13 * [S3(t/Dp - t\ Dp)] * [\cos(2*pi*fc*t + Ip + D3*pi/2)]\} \quad (2)$$

t is the instant that s(t) is computed;
Dp is the dibit period;
"*" denotes floating point multiplication;
"/" denotes floating point division;
" " denotes integer division;
pi=3.1416;
fc is the frequency of the unmodulated carrier;
Ip is the initial phase of the carrier.
D0, D1, D2, D3 are binary weighted values of the dibits in the dibit history generator.
S1, S3 have a weighted value of 0 to 1, which are the density functions of the "tail" segments of the step response curve.
S2 has a weighted value of 0 to 2, the density function of the middle portion of the step response. Referring to FIGS. 1A–1H, and particularly to FIG. 1A, "D" type flip-flop ICs 20, 22, 24, and 26 and three XOR gates 28, 30, and 32 combine to form a self-synchronizing 17-bit data scrambler. A serial digital data input stream from an information source is applied to pin 3 of flip-flop 20. Two outputs, representing the dibit value of the serial input sequence, are available at pins 4 and 13 of flip-flop 22. These dibit outputs are then fed to pins 3 and 4 of "D" flip-flop IC 34 (FIG. 1B). Flip-flop 34 forms part of a differential encoder, which is described in detail below.

As shown in FIG. 1A, two counters 36 and 38 form a 64 consecutive 1's detector. The function of the consecutive 1's detector is to prevent occasional lockup of the data scrambler by inverting the next data input to the scrambler if the detection condition is met.

A switch 39 connected to pin 9 of counter 38 is used to disable the data scrambler during handshaking or in non-DPSK modes.

When in the DPSK mode, the circuit is clocked at a 1200 Hz data rate.

When in the FSK mode, data transition detection is performed by sharing flip-flops 20, 22 and 24 and XOR gates 28 and 30, as described below, and the rest of the scrambler circuit is set to idle by pulling pin 9 of counter 38 low by closing switch 39. In this case, pins 12, 13 and 14 of multiplexer 42 (FIG. 1B) select 307.2 KHz as the clocking frequency to the scrambler.

As stated above, pins 4 & 13 of flip-flop 22 provide the inputs to a differential encoder which includes flip-flop 34 and ROM 44 (FIG. 1B). The outputs of the differential encoder are available at pins 11 & 12 of flip-flop 34.

ROM 44 is a 32×2 bit ROM which contains the codes for performing the differential encoding. The source listing of coding program "TXD.SRC" of ROM 44 is provided as microfiche Appendix B. A select input is available at pin 3 of ROM 44. A low level at this pin selects the low speed mode (600 baud); a high level sets the encoder back to the normal mode (1200 baud). The two different modes are selected by opening or closing switch 40.

When in the non-DPSK modes, i.e., FSK, DTMF and answer tone modes, the encoder outputs are set to logical zero by grounding pin 1 of flip-flop 34 through switch 46.

Flip-flop 22 and XOR gates 28 and 30, shown in FIG. 1A, and XOR gate 48, shown in FIG. 1B, combine to form an FSK data transition pulse generator. When operating in the FSK mode, the signal developed at pin 13 of flip-flop 22 is delayed by one clock period (307.2 KHz) referenced to pin 4 of flip-flop 22. These two signals are then provided as the inputs to XOR gate 48. Thus, when there is a transition at the data input, a strobing pulse is generated at the output of XOR gate 48. These strobing pulses are used to synchronize an envelope generator, which is described below.

Flip-flop 50 and multiplexer 52, shown in FIG. 1A, and multiplexer 54, shown in FIG. 1H, combine to form a dibit re-synchronizer and multiplexer. The data rate is asynchronous to the carrier frequency in the DPSK mode as well as in the FSK mode. In order to prevent spurious interferences, resync flip/flop 50 is provided to align the dibit clock edges to the carrier clock. The re-synchronizing clock to flip/flop 50 is provided by multiplexer 54 which selects one of the high-frequency carrier clocks from sine-wave counter 111. The selection is determined by the state of the hi/lo band switch input.

The re-synchronized dibit clock and the FSK transition strobing signal are then applied to multiplexer 42. The output of multiplexer 42 is connected to one of the two inputs under the control of the DPSK mode select input (pin 1).

As shown in FIGS. 1B–C, the output of multiplexer 42 is then routed to an envelope generator formed by flip-flop 56, three NOR gates 58, 60 and 62, envelope counter 64, ROM 66, counter 68, ROM 70, flip-flop 72, ROM 74 and flip-flop 76.

Flip-flop 56, the three NOR gates 58, 60, 62, and envelope counter 64 combine to form a state counter. The counter state is synchronized to either the resync dibit clock (DPSK mode) or the FSK data transition strobing signal (FSK mode). The counter starts from the "0th" state when initiated by the aforementioned signals and counts up to the "1023th" state if there is no early-synchronizing pulse. If there is an early-synchronizing pulse, the counter is forced to the "0th" state. After the reset, the counter repeats the counting sequence. If there is a late synchronizing pulse, the counter stays at the "1023th" count until the next pulse appears. In the DPSK mode, the early/late pulses are caused by the asynchronous data/carrier clocks. In the FSK mode, the pulses result from the asynchronization and from missing transitions in the data input sequence.

ROM 66 is a 1024×4 bit ROM. It decodes the counter states and develops four output signals: D0 (pin 14), D1 (pin 13), D2 (pin 12), and D3 (pin 11).

The time function of the D0 output represents the density function of the middle portion of the DPSK modulator step response. It is Sigma-Delta encoded with 1024-bit resolution in a dibit period.

The coding of the D1 output multiplexes the density functions of the two tail portions of the step response in an alternating manner. Each portion has 512-bit resolution in a dibit period. The demultiplexing control signal is taken from pin 9 of envelope counter 64. This arrangement simplifies the design of the phase modulator.

The D2 output is used to hold the state counter when there is a late synchronizing pulse.

The D3 output is used for controlling the FSK modulator spectrum. It enables 3-bit counter 68 to count up at predefined intervals after each data input transition. The predefined intervals are calculated based on a raised-cosine transition. The program listing "RGCR.SRC/DTMFL.SRC/DTMFH.SRC" for the raised-cosine transition function is provided in microfiche Appendix C.

During the FSK mode, 3-bit counter 68 is reset to zero after each data transition. This is accomplished by a clearing signal fed from pin 14 of flip-flop 56. After the reset, the enable signal from pin 11 of ROM 66 allows the counter to count up at pre-defined intervals. Once the counter hits the maximum count, it will remain at this state until the sequence is reinitiated by the next data transition. The outputs of the counter are then used to address frequency look-up codes stored in look-up ROM 70.

Before the look-up process, ROM 70 senses the polarity of the data input signal via the connection between pin 3 of flip-flop 24 and pin 13 of ROM 70 to determine the proper frequency stepping direction. On every input data transition, the circuit steps through six intermediate frequencies before it hits the destination frequency.

Since the answer tone frequencies are embedded in the FSK frequencies, the pin 14 input of ROM 70 is assigned to address these frequencies when the circuit operates in the answer tone mode. In this case, the data input on pin 13 of ROM 70 is used to select one of the two answer tones while the outputs from the counter 68 are ignored. The program "ATNE.SRC" used to code ROM 70 is provided as microfiche Appendix D.

On the DPSK side, the three envelope outputs, i.e. pins 5, 13 and 14 of ROM 66, are fed to a data switching ROM 74, as shown in FIG. 1C. Data switching ROM 74 also receives an array of signals from flip-flop 72 which shows the phase history of the input dibit signal. Data switching ROM 74 then multiplexes all of the input signals to form two sets of outputs. The first set, i.e. pins 13 and 14 of ROM 74, is assigned to the phase envelope generation of the middle portion of the system step response. The second set, i.e. pins 11 and 12 of ROM 74, is used for the two tail portions. Each set is 2 bits wide and its binary weighting represents one of the four carrier phases. These four outputs are routed to ROM 78 (FIG. 1E) via pipeline flip-flop 76. The program "DSR.SRC" for coding data switching ROM 74 is provided in microfiche Appendix E.

Figure 1F:
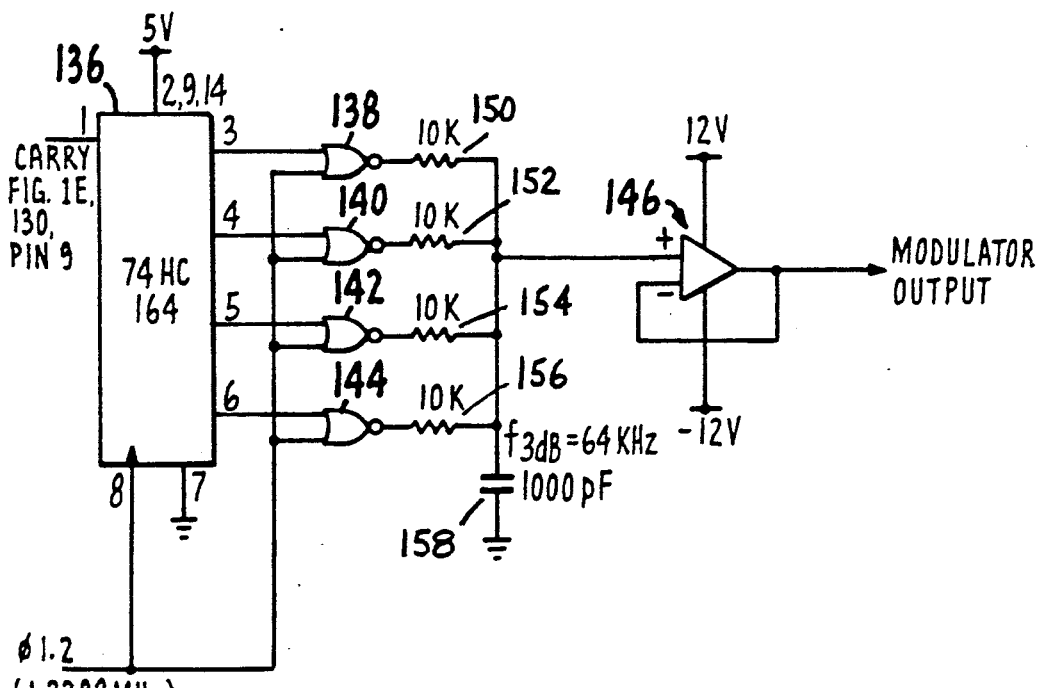
Figure 1G:
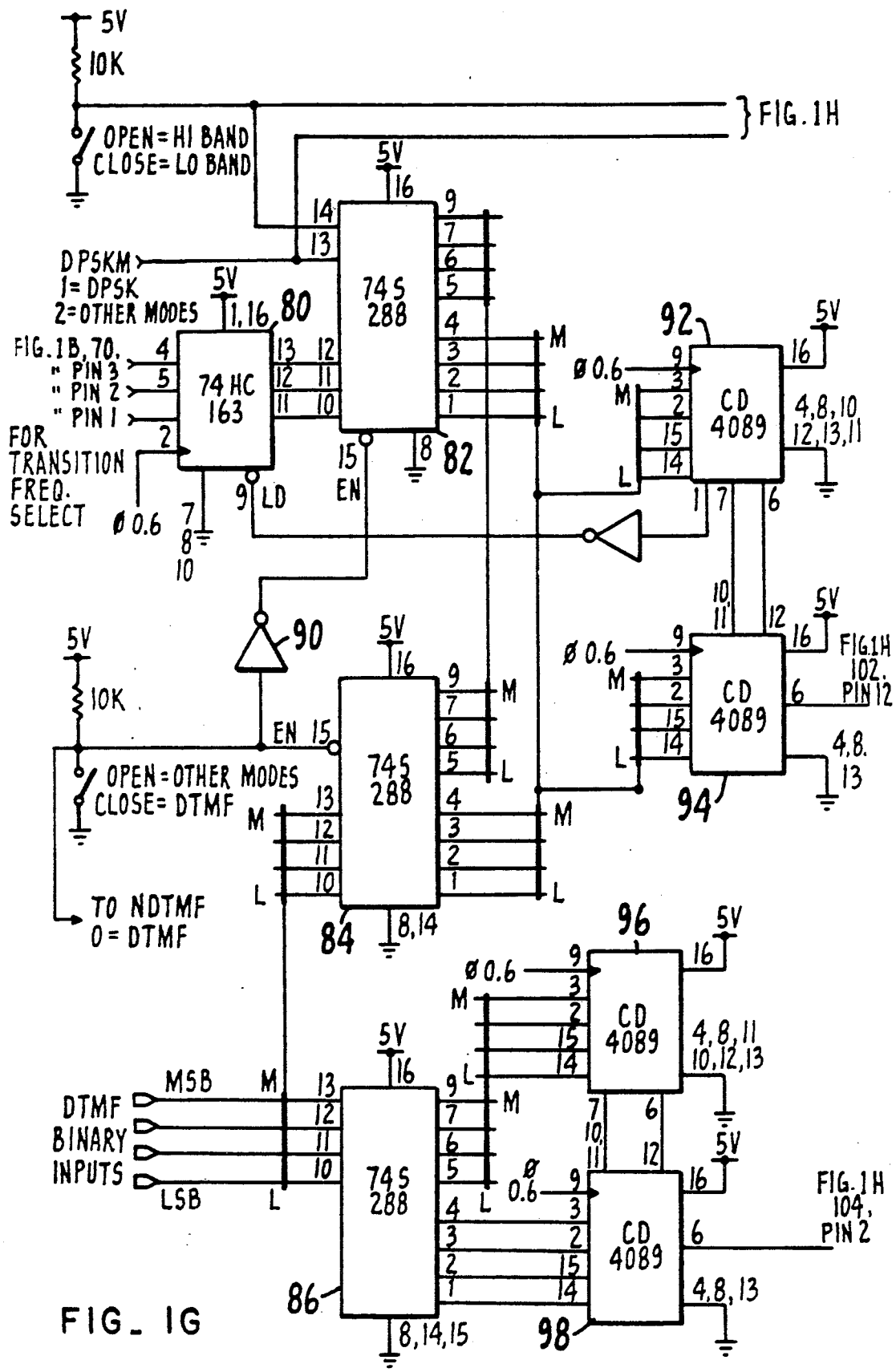

Referring to FIGS. 1G–1H, counter 80, code converter 82, 84 and 86, inverters 88 and 90, rate multipliers 92, 94 and 96, 98, NAND gate 100, flip-flops 102 and 104 and NOR gates 106 and 108 combine to form a dual frequency generator. The tone/carrier frequency generation is based on a 614.4 KHz clock source and the multiplying function of a rate multiplier.

There are two almost identical generator circuits employed in the system. Code converter ROMs 82 and 84, rate multiplier 92, 94, flip-flop 102 and NOR gate 106 form the first generator, which is responsible for generating the DPSK/FSK carrier frequencies, the answer tones and the low-band DTMF tones. The second generator consists of ROM 86, rate multiplier 96, 98, flip-flop 104 and NOR gate 108 and is responsible for generating the high-band DTMF tone. The frequency generated is a fractional quantity of the input frequency. The fractional quantity is the result of the coding applied to the rate multiplier over the repeating sequence of the rate multiplier. In the case of the illustrated circuit configuration, a simplified equation can be written as follows:

$$\text{Frequency out (KHz)} = 614.4 * \text{input code}/256 \quad (3)$$

Code converter 82 is used to set up the frequency select codes to the first rate multiplier when the circuit operates in the FSK/DPSK/Answer Tone modes. Gated "D" type flip-flop 80 is used for synchronous loading of the FSK transition frequency select outputs from look-up ROM 70 into code converter 82. During the DTMF mode, code converter 82 is in the tri-state mode and a DTMF code converter 84 is enabled for the low-band frequency generation. Code converter 86 is the high-band DTMF converter for the second frequency generator.

During the DPSK high-band mode, the generator is defeated by pulling pin 10 of flip-flop 102 low. The output frequency measured at the output of NOR gate 106 is the same as the input frequency, which is 614.4 KHz.

The outputs of the two frequency generators are available at the outputs of NOR gates 106 and 108, respectively. A summary showing the accuracies of the frequencies synthesized is provided in Table 1 below.

TABLE 1

| | FREQUENCY DEVIATIONS | | | | |
|---|---|---|---|---|---|
| NO. | FREQ | FREQ GEN | DELTA F | ERR % | CNTL NUM |
| DPSK: | | | | | |
| 0 | 1200.0000 | 1200.0000 | 0.0000 | 0.00 | 128 |
| FSK: | | | | | |
| 1 | 1070.0000 | 1068.7500 | 1.2500 | −.12 | 114 |
| 2 | 1079.1175 | 1078.1250 | .9925 | −.09 | 115 |
| 3 | 1105.0800 | 1106.2500 | −1.1700 | .11 | 118 |
| 4 | 1143.7043 | 1143.7500 | −.0457 | .00 | 122 |
| 5 | 1188.1568 | 1190.6250 | −2.4682 | .21 | 127 |
| 6 | 1229.6848 | 1228.1250 | 1.5598 | −.13 | 131 |
| 7 | 1259.2698 | 1256.2500 | 3.0198 | −.24 | 134 |
| 8 | 1270.0000 | 1265.6250 | 4.3750 | −.34 | 135 |
| FSK / Answer tones: | | | | | |
| 9 | 2025.0000 | 2025.0000 | 0.0000 | 0.00 | 216 |
| 10 | 2034.4661 | 2034.3750 | .0911 | −.00 | 217 |
| 11 | 2061.2259 | 2062.5000 | −1.2741 | .06 | 220 |
| 12 | 2100.5180 | 2100.0000 | .5180 | −.02 | 224 |
| 13 | 2145.0066 | 2146.8750 | −1.8684 | .09 | 229 |
| 14 | 2185.8957 | 2184.3750 | 1.5207 | −.07 | 233 |
| 15 | 2214.6474 | 2212.5000 | 2.1474 | −.10 | 236 |
| 16 | 2225.0000 | 2221.8750 | 3.1250 | −.14 | 237 |
| DTMF: | | | | | |
| 17 | 697.0000 | 693.7500 | 3.2500 | −.47 | 74 |
| 18 | 770.0000 | 768.7500 | 1.2500 | −.16 | 82 |
| 19 | 852.0000 | 853.1250 | −1.1250 | .13 | 91 |
| 20 | 941.0000 | 937.5000 | 3.5000 | −.37 | 100 |
| 21 | 1209.0000 | 1209.3750 | −.3750 | .03 | 129 |
| 22 | 1336.0000 | 1340.6250 | −4.6250 | .35 | 143 |
| 23 | 1477.0000 | 1481.2500 | −4.2500 | .29 | 158 |
| 24 | 1633.0000 | 1631.2500 | 1.7500 | −.11 | 174 |

As shown in FIG. 1H, a sine-wave counter and multiplexer is formed by sine-wave counters 111 and 112, multiplexers 114 and 116, counter 118, inverters 120 and 122, and NAND gate 124. The two clock outputs from the dual frequency generator are fed to two 8-bit sinewave counters 111 and 112, respectively. The outputs of these two counters are then multiplexed to form one set of outputs such that the select input, i.e. pin 1 of multiplexer 114 and pin 1 of multiplexer 116, determines the "on" time for each counter. During the non-DTMF modes, the first counter 111 is always on and the outputs from the second counter 112 are ignored. During the DTMF mode, the circuit formed by counter 118, inverter 122 and NAND gate 124 is activated and a select signal with a 3 to 4 duty cycle ratio is applied to the select pins. The difference in duty cycle provides an amplitude blending ratio such that the amplitude of the high-band frequencies is boosted by 2.5 dB referenced to the low band frequencies.

Referring to FIG. 1E, ROM 78, sine-wave look-up ROM 126 and flip-flop 128 form a phase modulator and sine-wave look-up ROM. The five low order output bits from the sine wave counter/multiplexer, i.e. pin 12 of multiplexer 114 and pins 4, 7, 9 and 12 of multiplexer 116 are fed to the five low-order bits of sine-wave look-up ROM 126. These signals signify the phase angle location of a sine-wave within a quadrant. The two high-order bits from pins 7, 9 of multiplexer 114 are connected to phase-adder ROM 78 which is a dual 2-bit adder. The adder circuit modulates the two sets of phase outputs from the envelope generator with the phase of the carrier generated by sine-wave counter 111.

Look-up ROM 126 contains a sine-wave look-up table plus a vector summer. The vector generated by the phase inputs at pins 19 and 18 of ROM 126 is scaled down and subtracted from the vector generated by the signals at pins 17 and 16. The source listings "MEG.SRC/CSM.SRC" and "PADD.SRC" for the coding algorithm for look-up ROM 126 and phase-adder ROM 78, respectively, are provided at microfiche Appendices F and G, respectively.

During the non-DPSK modes, the two sets of phase inputs are inactive due to the effect of the clearing signal applied to "D" flip-flop 34. Adder 78 then becomes a "fall-through" type of buffer, and the output from look-up ROM 126 is simply an unmodulated sine-wave.

Flip-flop 128 is added for pipelining the outputs into the next section of the circuit, a digital-to-analog converter (DAC) formed by adders 130 and 132 and flip-flop 134.

The parallel outputs from phase modulator look-up ROM 126 are converted to a digital bit stream at pin 9 of adder 130. A simple low-pass filter, such as an RC network, may be utilized to convert the digital bit stream to an analog signal. Since this digital circuit is a direct drop-in replacement for a conventional analog DAC (the RC filter could be treated as the antialias filter), the circuit is termed the "Digital-DAC" although it sends out a digital signal rather than the analog counterpart.

The entire DAC circuit is basically an accumulator with the carry bit connected as the DAC output. The underlying theory is that the circuit performs as a real time Sigma-Delta encoder; the adding function of the accumulator does the "Sigma" portion of the incoming parallel data while the carry output performs the "Delta" function on accumulator overflow. Once the accumulator overflows, a logical "1" is generated at the carry output and an amount equal to the carry weighting is subtracted from the accumulator.

Due to the spreaded spectrum characteristic of the switching waveform, it is desirable to place a low-pass filter after this block to remove the unwanted high frequency components.

Referring to FIG. 1F, shift register 136, NOR gates 138, 140, 142 and 144 and voltage buffer 146 form a notch insertor. In order to remove the high frequency components economically, a switched-capacitor low-pass filter is considered a primary choice to replace the RC filter. The notch insertor circuit interfaces the digital DAC output to a switched-capacitor filter such that frequency notches are inserted at all multiples of the sampling frequency of the switched-capacitor filter. The insertion of frequency notches eliminates the alias frequency foldback problem.

Shift-register 136 and the RC network form a 4-tap FIR filter. A sinx/x filter characteristic is achieved by choosing equal values for the four associated resistors 150, 152, 154, 156. In this case, the Weighting function is rectangular and frequency notches appear at all multiples of 307.2 KHz. A capacitor 158 placed after the resistors provides a 3 dB roll-off frequency at about 64 KHz. This prevents a slewing problem from appearing in circuits placed after this block; high frequency component rejection is not the primary design concern.

The NOR gates 138, 140, 142 and 144 are added to eliminate the effects of the asymmetrical drive characteristic of shift register 136. The output signals from shift register 136 are gated with a 1.2288 MHz clock before the filter-tap summing point, so a better even-harmonic rejection can be achieved. Component 146 is simply a voltage buffer for driving purpose.

The design of the switched-capacitor filter as well as other blocks placed after the filter are not essential to an understanding of the present invention. Therefore, detailed description of these conventional elements are not provided.

It should be noted that all of the performance displays, i.e., FIGS. 6A-B, 7A-B, 8A-P, 9A-B, 10A-B, 11A-D, 12A-D and 13A-D, of the modulator/generator are taken at the output of voltage buffer 146.

The following Table 2 lists the nine ROMs used in the above-described circuit together with their corresponding program names; the program listings are provided in the microfiche Appendices.

TABLE 2

| APPENDIX | PROGRAM NAME | ROM |
|---|---|---|
| A | TXRESP.SRC | |
| B | TXD.SRC | 44 |
| C | RGCR.SRC | 82 |
| | DTMFL.SRC | 84 |
| | DTMFH.SRC | 86 |
| D | ATNE.SRC | 70 |
| E | DSR.SRC | 74 |
| F | MEG.SRC | 66 |
| | CSM.SRC | 126 |
| G | PADD.SRC | 78 |

All of the above-identified programs are self-contained except "MEG/CSM.SRC". This program requires an input data file "STEP.BDAT". The input data file contains the system step response information which is generated by the "TXRESP.SRC" program provided in microfiche Appendix A.

The "TXRESP.SRC" program performs a Discrete Inverse-Fourier Transform (DIFT) function and utilizes a "frequency sampling" method on input frequency data. A modified "Kaiser" window is then applied to the time function to achieve a truncated 3-dibit interval impulse/step response.

Microfiche Appendices A-G are hereby incorporated as an integral part of this Detailed Description of the Invention.

It should be understood that various alternatives to the embodiments of the invention described herein may be employed in practicing the invention. It is intended that the following claims define the invention and that circuits within the scope of these claims and their equivalents be covered thereby.

What is claimed is:

1. A differential phase shift keying DPSK modulator for modulating a carrier waveform to provide a phase modulated output signal, the DPSK modulator comprising:
    (a) data scrambler means responsive to a digital data input signal sequence for generating a corresponding sequence of dibit signals;
    (b) encoding means for differentially encoding the sequence of dibit signals;
    (c) a dibit history generator responsive to the sequence of differentially encoded dibit signals for generating corresponding phase modulating vectors; and
    (d) modulating means for modulating the carrier waveform utilizing the phase modulating vectors to generate the phase modulated output signal.

2. A DPSK modulator as in claim 1 and further including means for shifting a plurality of consecutive differentially encoded dibit signals through the dibit history generator at consecutive dibit intervals whereby the dibit history generator generates a plurality of digital phase modulating vectors representing the binary weighted values of the corresponding differentially encoded dibit signals.

3. A DPSK modulator as in claim 2 wherein the DPSK modulator is a 4-phase modulator such that the dibit history generator generates four digital phase modulating vectors.

4. A differential phase shift keying DPSK modulator for modulating a carrier waveform to provide a phase modulated output signal, the DPSK modulator comprising:
    (a) a data scrambler responsive to a serial digital data input sequence for generating a corresponding sequence of dibit signals;
    (b) encoding means for differentially encoding the dibit signals;
    (c) weighting means responsive to the sequence of differentially encoded dibit signals for generating a plurality of digital signals representing the binary weighted values of the corresponding differentially encoded dibit signals;
    (d) phase modulating means for phase modulating the plurality of digital signals;
    (e) density modulating means for density modulating the phase modulated digital signals;
    (f) scaling means for scaling the density modulated digital signals according to the breakdowns of a step response to generate at least one phase modulating vector; and
    (g) waveform modulating means for modulating the carrier waveform utilizing the at least one phase modulating vector to generate the phase modulated output signal.

5. A DPSK modulator as in claim 4 wherein the waveform modulating means comprises:
    (a) a phase adder which modulates the phase of the at least one phase modulating vector with the phase of the carrier waveform; and
    (b) a vector summor which receives an output signal from the phase adder and generates a corresponding digital signal representing a modulated sinewave.

6. A DPSK modulator as in claim 5 wherein the corresponding digital signal is a parallel output signal and the waveform modulating means further includes:
    (a) conversion means for converting the parallel output signal to a digital bit stream; and
    (b) a digital-to-analog converter for converting the digital bit stream to an analog phase modulated output signal.

* * * * *